US009951920B2

(12) United States Patent
Masuda et al.

(10) Patent No.: US 9,951,920 B2
(45) Date of Patent: Apr. 24, 2018

(54) VEHICLE LAMP CONTROL SYSTEM

(71) Applicant: KOITO MANUFACTURING CO., LTD., Minato-ku, Tokyo (JP)

(72) Inventors: Takeshi Masuda, Shizuoka (JP);
Michihiko Hayakawa, Shizuoka (JP);
Takao Muramatsu, Shizuoka (JP);
Misako Nakazawa, Shizuoka (JP);
Hidetada Tanaka, Shizuoka (JP);
Yuichi Shibata, Shizuoka (JP)

(73) Assignee: KOITO MANUFACTURING CO., LTD., Mintao-ku, Tokyo (JP)

( * ) Notice: Subject to any disclaimer, the term of this patent is extended or adjusted under 35 U.S.C. 154(b) by 63 days.

(21) Appl. No.: 15/025,076

(22) PCT Filed: Sep. 25, 2014

(86) PCT No.: PCT/JP2014/075456
§ 371 (c)(1),
(2) Date: Mar. 25, 2016

(87) PCT Pub. No.: WO2015/046346
PCT Pub. Date: Apr. 2, 2015

(65) Prior Publication Data
US 2016/0238210 A1 Aug. 18, 2016

(30) Foreign Application Priority Data

Sep. 26, 2013 (JP) .................................. 2013-199407
Sep. 26, 2013 (JP) .................................. 2013-199409

(51) Int. Cl.
F21S 41/663 (2018.01)
F21S 8/10 (2006.01)
(Continued)

(52) U.S. Cl.
CPC ........ *F21S 48/1784* (2013.01); *B60Q 1/0017* (2013.01); *B60Q 1/143* (2013.01);
(Continued)

(58) Field of Classification Search
CPC .. F21S 48/1784; F21S 48/1154; F21S 48/145; F21S 48/1747; F21S 48/1773; F21S 48/31; B60Q 1/0017; B60Q 1/143
See application file for complete search history.

(56) References Cited

U.S. PATENT DOCUMENTS

2013/0141928 A1    6/2013   Puente et al.

FOREIGN PATENT DOCUMENTS

CN    102109137 A    6/2011
CN    103133959 A    6/2013
(Continued)

OTHER PUBLICATIONS

Communication dated Jun. 8, 2017, issued by the European Patent Office in counterpart European Application No. 14849210.1.
(Continued)

Primary Examiner — Anne Hines
(74) Attorney, Agent, or Firm — Sughrue Mion, PLLC

(57) ABSTRACT

A vehicle lamp control system is provided which can not only restrict a semiconductor light emitting element from being deteriorated or damaged by sunlight and but also maintain an illumination efficiency of the semiconductor light emitting element. The vehicle lamp control system includes a projection lens, semiconductor light emitting elements disposed near a rear focal point of the projection lens and emit light towards the projection lens, a movable shade which can move between a shading position where the movable shade cuts off light emitted from the semiconductor light emitting elements to be incident on the projection lens and a non-shading position where the movable shade does
(Continued)

not cut off light emitting elements to be incident on the projection lens, and a headlamp control unit which executes a control in which the movable shade is moved to the shading position with the semiconductor light emitting elements left switched off.

19 Claims, 18 Drawing Sheets

(51) Int. Cl.
  *B60Q 1/00* (2006.01)
  *B60Q 1/14* (2006.01)
  *F21V 23/00* (2015.01)
  *F21V 23/04* (2006.01)

(52) U.S. Cl.
  CPC .......... *F21S 41/143* (2018.01); *F21S 41/285* (2018.01); *F21S 41/32* (2018.01); *F21S 41/43* (2018.01); *F21S 41/663* (2018.01); *F21S 41/686* (2018.01); *F21S 45/10* (2018.01); *F21V 23/003* (2013.01); *F21V 23/0471* (2013.01); *B60Q 2300/056* (2013.01); *B60Q 2300/112* (2013.01); *B60Q 2300/32* (2013.01); *B60Q 2300/41* (2013.01); *B60Q 2300/42* (2013.01); *B60Q 2300/45* (2013.01); *F21S 41/255* (2018.01); *F21S 45/47* (2018.01)

(56) References Cited

FOREIGN PATENT DOCUMENTS

| | | |
|---|---|---|
| DE | 102011079570 A1 | 1/2013 |
| EP | 1821032 A1 | 8/2007 |
| EP | 2479488 A1 | 7/2012 |
| EP | 2 546 567 A2 | 1/2013 |
| JP | 2010-262766 A | 11/2010 |
| JP | 2010-282794 A | 12/2010 |
| JP | 2011-124100 A | 6/2011 |
| JP | 2012-151058 A | 8/2012 |
| JP | 2013-20831 A | 1/2013 |
| JP | 2013-115046 A | 6/2013 |

OTHER PUBLICATIONS

International Search Report dated Oct. 28, 2014 issued by the International Searching Authority in counterpart International Application No. PCT/JP2014/075456 (PCT/ISA/210).

Written Opinion dated Oct. 28, 2014 issued by the International Searching Authority in counterpart International Application No. PCT/JP2014/075456 (PCT/ISA/237).

Communication dated Jan. 4, 2017, issued by the State Intellectual Property Office of the People's Republic of China in counterpart Chinese Patent Application No. 201480052993.5.

VEHICLE LAMP CONTROL SYSTEM

TECHNICAL FIELD

The present invention relates to a vehicle lamp control system.

BACKGROUND ART

As an example of a vehicle lamp, a vehicle headlamp apparatus is known which employs as a light source a plurality of light emitting elements (for example, light emitting diodes) which are arranged into an array. In this vehicle headlamp apparatus, at least one of a plurality of partial areas which make up an illuminating range can selectively be put in an illuminated or a non-illuminated state by controlling the light emitting elements independently so as to be turned on or off. Additionally, it is stated that a movable shade is provided in this vehicle headlamp apparatus, whereby when a pedestrian is detected, the movable shade which is disposed in a withdrawal position is caused to move to a front surface side of the array of light emitting elements so as to prevent the illumination of the head of the pedestrian (refer, for example, to Patent Literature 1).

PRIOR ART LITERATURE

Patent Literature

Patent Literature 1: JP-A-2013-20831

SUMMARY OF THE INVENTION

Problems to be Solved by the Invention

Incidentally, in a vehicle including a vehicle headlamp apparatus like the one described in Patent Literature 1, since a movable shade is normally disposed in a withdrawal position, a front surface side of an array of light emitting elements is left open towards an exterior portion. Because of this, there may be a case where sunlight is collected by a projection lens to be shone on to the array of light emitting elements. Then, the light emitting elements are deteriorated or damaged by the sunlight collected by the projection lens and heat thereof, leading to fears that the illumination efficiency of the headlamp apparatus is reduced.

One object of the invention is to provide a vehicle lamp control system which can restrict semiconductor light emitting elements from being deteriorated or damaged by sunlight so as to maintain the illumination efficiency of the semiconductor light emitting elements.

In addition, in the vehicle including the vehicle headlamp apparatus described in Patent Literature 1, for example, when the vehicle speed reaches a predetermined speed during night time driving, with a view to enhancing the forward visibility of the driver, the array of light emitting elements can be controlled to be illuminated to shine a high beam. Further, when a preceding vehicle is detected in the state where the high beam is being shone, the movable shade can be controlled to move to narrow the illuminating range of the vehicle headlamp apparatus so as to restrict the generation of glare to occupants of the preceding vehicle.

Incidentally, in the vehicle headlamp apparatus of Patent Literature 1, the array of light emitting elements is lit abruptly to illuminate brightly the area lying ahead of the vehicle all of a sudden, leading to fears that the driver of the subject vehicle is forced to feel the sensation of physical disorder.

Another object of the invention is to provide a vehicle lamp control system which can enhance the visibility of a driver while reducing a risk of the driver being forced to feel the sensation of physical disorder when a headlamp is lit.

Means for Solving the Problem

A vehicle lamp control system which can solve the problem includes:
  a projection lens;
  a semiconductor light emitting element which is disposed near a rear focal point of the projection lens and which emits light towards the projection lens;
  a movable shade which can move between a shading position where the movable shade can cut off light which is emitted from the semiconductor light emitting element to be incident on the projection lens and a non-shading position where the movable shade does not cut off light which is emitted from the semiconductor light emitting element to be incident on the projection lens; and
  a control unit configured to execute a control to move the movable shade to the shading position when the semiconductor light emitting element is left switched off.

According to the vehicle lamp control system configured in the way described above, the movable shade is moved to the shading position when the semiconductor light emitting element is left switched off. By adopting this configuration, the sunlight collected by the projection lens can be cut off by the movable shade, so that the sunlight can be prevented from being shone on to the semiconductor light emitting element. Consequently, the semiconductor light emitting element can be restricted from being deteriorated or damaged by the sunlight collected by the projection lens and the heat of the sunlight so collected, thereby making it possible to maintain the illumination efficiency of the semiconductor light emitting element.

The vehicle lamp control system of the invention may include:
  an optical member configured to transmit or reflect at least part of light incident thereon, and
  the movable shade may have a reflecting portion at a portion which faces the projection lens, and
  the optical member may be disposed in a position where light which passes through the projection lens to be reflected by the reflecting portion can be incident on the optical member with the movable shade caused to move to the shading position by the control unit.

According to the vehicle lamp control system configured in the way described above, the sunlight light reflected by the reflecting portion of the movable shade is shone on to the optical member so that the reflected sunlight passes through the optical member or is reflected by the optical member. By adopting this configuration, the external design of the lamp can be improved by making use of the sunlight during daytime.

The vehicle lamp control system of the invention may include:
  a solar module having a generating device, and
  the movable shade may have a reflecting portion at a portion which faces the projection lens, and
  the generating device may be disposed in a position where light which passes through the projection lens to be reflected by the reflecting portion can be incident on the generating device with the movable shade caused to move to the shading position by the control unit.

According to the vehicle lamp control system configured in the way described above, the sunlight reflected by the reflecting portion of the movable shade is received by the solar battery module, which then generates electricity by making use of the sunlight. This enables the effective use of solar energy during daytime.

The vehicle lamp control system which can solve the problem includes:

a first lamp unit which can shine light for forming a first light distribution pattern head of a lamp;

a second lamp unit having a semiconductor light emitting element and a movable shade which is configured to move in a predetermined direction and which can change a shading range where light emitted from the semiconductor light emitting element is cut off according to a position to which the movable shade is moved and able to shine the light of the semiconductor light emitting element to form a second light distribution pattern in a position lying further slightly upwards than the first light distribution pattern; and a control unit configured to execute a control in which the semiconductor light emitting element is illuminated after the movable shade is disposed in a shading position where the movable shade can cut off the light from the semiconductor light emitting element and thereafter, the movable shade is moved so as to reduce the shading range after the semiconductor light emitting element is illuminated.

According to the vehicle lamp control system configured in the way described above, in switching the semiconductor light emitting element from the switched off state to the switched on state, the control is executed in which the semiconductor light emitting element is illuminated after the movable shade is disposed in the shading position, and the movable shade is moved to reduce the shading range after the semiconductor light emitting element is illuminated. Consequently, compared with the case where the wide forward area ahead of the vehicle is illuminated suddenly by the second lamp unit, the light shining or illumination range is caused to change continuously so as to expand gradually from the narrow illumination range, whereby the forward vision of the driver can be enhanced while restricting the driver from having to feel a sensation of physical disorder. In addition, the light distribution pattern can be made to change visually smartly. Additionally, since the area on to which the light from the second lamp unit is shone is expanded gradually by moving the movable shade, compared with the case where the second lamp unit is illuminated suddenly, the driver is allowed to get used to the flow of the light distribution pattern when the second lamp unit is switched on, whereby the load of the driver in relation to watching the change in light distribution pattern can be mitigated.

In the vehicle lamp control system of the invention, it is preferable that in the second lamp unit, a plurality of semiconductor light emitting elements like the semiconductor light emitting element are arranged so as to be aligned in a predetermined direction and that the second light distribution pattern is formed by light from the plurality of semiconductor light emitting elements.

According to the vehicle lamp control system configured in the way described above, compared with the case where light is shone suddenly on to the forward area lying ahead of the vehicle by the plurality of semiconductor light emitting elements making up the second lamp unit to form the second light distribution pattern, whereafter the shielding is executed, the forward vision of the driver can be enhanced while restring the driver from having to feel a sensation of physical disorder.

It is preferable that the vehicle lamp control system according to the invention includes:

a vehicle speed sensor for measuring a traveling speed of a vehicle; and a preceding vehicle detection sensor for detecting a preceding vehicle, and when the traveling speed exceeds a predetermined value, the control unit executes a control in which the semiconductor light emitting element is illuminated after the movable shade is disposed in the shading position, and the movable shade is moved to reduce the shading range after the semiconductor light emitting element is illuminated.

According to the vehicle lamp control system configured in the way described above, even in the event that a sign board or a traffic signal is erroneously recognized as a preceding vehicle, the drawback can be restricted in which the light shining or illumination area of the light shone from the second lamp unit changes greatly to cause the driver to feel troublesomeness.

In the vehicle lamp control system according to the invention, it is preferable that the first light distribution pattern is a low beam light distribution pattern, and that the second light distribution pattern is a high beam light distribution pattern.

According to the vehicle lamp control system configured in the way described above, in forming the high beam light distribution pattern which illuminates a far area lying ahead of the vehicle, the semiconductor light emitting element is illuminated after the movable shade is disposed in the shading position, and the movable shade is moved to reduce the shading range after the semiconductor light emitting element is illuminated. Thus, the forward vision of the driver can be enhanced while restricting the driver from having to feel a sensation of physical disorder when the high beam is started to be shone.

In the vehicle lamp control system according to the invention, it is preferable that in switching the semiconductor light emitting element from a switched on state to a switched off state, the control unit executes a control in which the semiconductor light emitting element is switched off after the movable shade is moved to the shading position.

According to the vehicle lamp control system configured in the way described above, in switching the semiconductor light emitting element from the switched on state to the switched off state, compared with the case where the second lamp unit is switched off suddenly by switching off the semiconductor light emitting element after the movable shade is moved to the shading position, since the light shining or illumination range of the light shone from the second lamp unit is reduced gradually, the driver can be restricted from having to feel a sensation of physical disorder also when the second lamp unit is switched off. In addition, the light distribution pattern can be made to change visually smartly.

Advantage of the Invention

According to the invention, the semiconductor light emitting element can be restricted from being deteriorated or damaged by sunlight, and the illumination efficiency of the semiconductor light emitting element can be maintained.

In addition, according to the invention, the forward vision of the driver can be enhanced while restricting the driver from having to feel a sensation of physical disorder when the second lamp unit is switched on.

MODES FOR CARRYING OUT THE INVENTION

Figure 1:
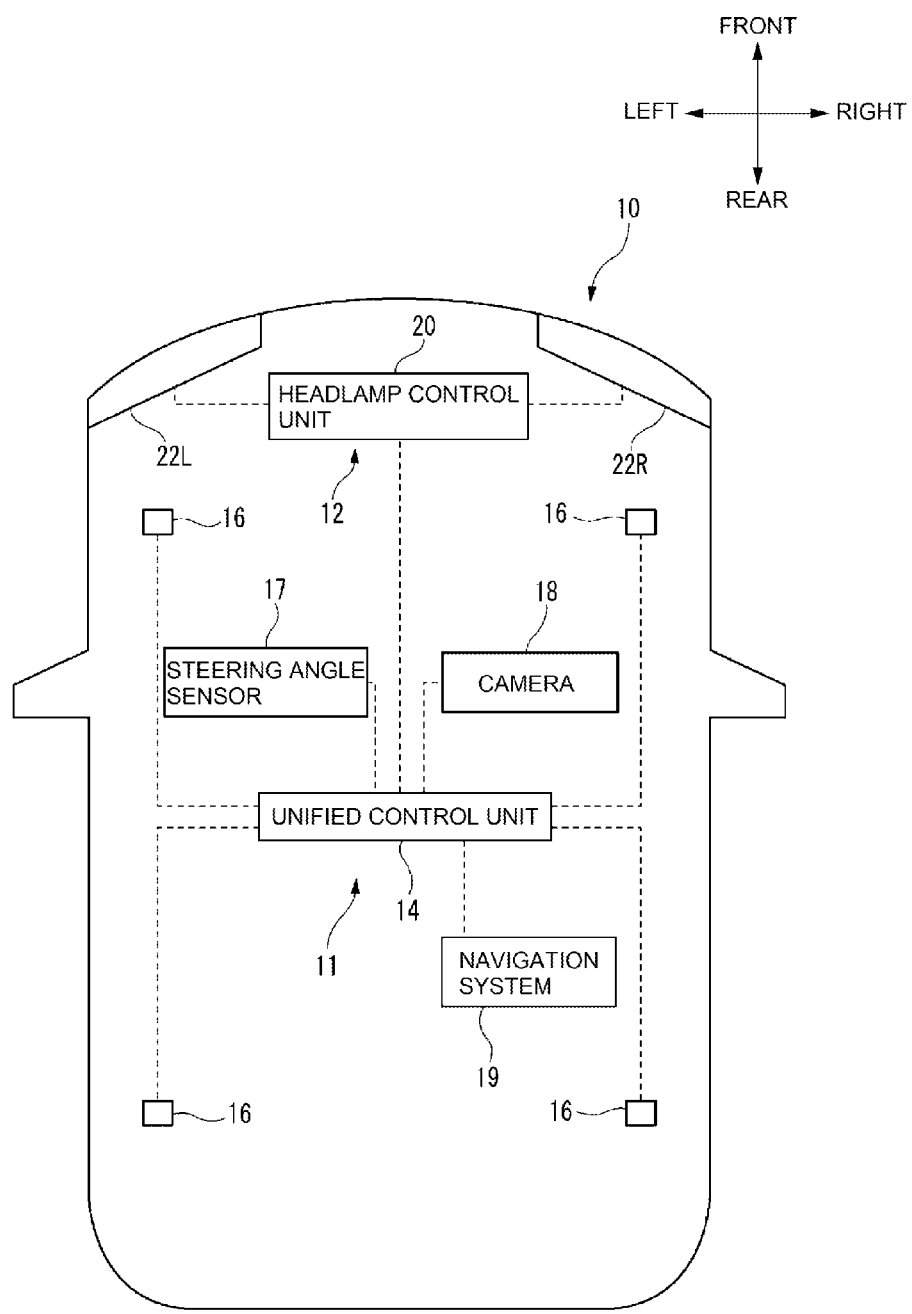
FIG. 1 is a diagram showing schematically an overall configuration of a vehicle in which a vehicle lamp control system according to a first embodiment of the invention is installed.

The invention will be described in detail below while referring to the accompanying drawings. In the drawings used to describe the invention, scales are changed as required to show constituent members in recognizable sizes.

First Embodiment

FIG. 1 shows schematically an overall configuration of a vehicle 10 in which a vehicle lamp control system 11 according to a first embodiment of the invention is installed. The vehicle lamp control system 11 includes a headlamp apparatus 12, an unified control unit 14, wheel speed sensors 16 (an example of a vehicle speed sensor), a steering angle sensor 17, a camera 18 (an example of a preceding vehicle detection sensor), and a navigation system 19.

The unified control unit 14 includes a CPU for executing various arithmetic operations, a ROM for storing various control programs, and a RAM which is used as a working area for storing data and executing the programs and executes various controls in the vehicle 10.

The wheel speed sensors 16 are provided so as to correspond individually to four wheels, that is, left and right front wheels and left and right rear wheels which are assembled to the vehicle 10. The wheel speed sensors 16 are connected individually to the unified control unit 14 so as to communicate therewith and outputs signals which signal rotation speeds of the wheels. The unified control unit 14 calculates a speed of the vehicle 10 by making use of the signals inputted thereinto from the wheel speed sensors 16.

The steering angle sensor 17 is provided on a steering shaft and is connected to the unified control unit 14 so as to communicate therewith. The steering angle sensor 17 outputs a steering angle pulse signal corresponding to a steering angle through which the steering shaft is turned by a driver. The unified control unit 14 calculates a traveling direction of the vehicle 10 by making use of the signals inputted thereinto from the steering angle sensor 17.

The camera 18 includes an imaging device such as a CCD (Charged Coupled Device) sensor or a CMOS (Complementary Metal Oxide Semiconductor) sensor and generates image data by imaging an area lying ahead of the vehicle. The camera 18 is connected to the unified control unit 14 so as to communicate therewith and outputs the image data generated to the unified control unit 14.

The navigation system 19 is connected to the unified control unit 14 so as to communicate therewith and outputs information informing of an area where the vehicle 10 is traveling to the unified control unit 14.

The headlamp apparatus 12 includes a headlamp control unit 20, a right headlamp unit 22R and a left headlamp unit 22L. Hereinafter, the right headlamp unit 22R and the left headlamp unit 22L will be referred to as a headlamp unit 22 as required. The headlamp control unit 20 includes a CPU for executing various arithmetic operations, and a RAM which is used as a working area for storing data and executing programs. The headlamp control unit 20 has a ROM for storing various control programs and controlling information. The headlamp control unit 20 controls light shone from the headlamp unit 22 based on the control signal transmitted from the unified control unit 14 and the various pieces of information stored in the ROM. The headlamp control unit 20 functions as a control unit according to the invention.

Figure 2:
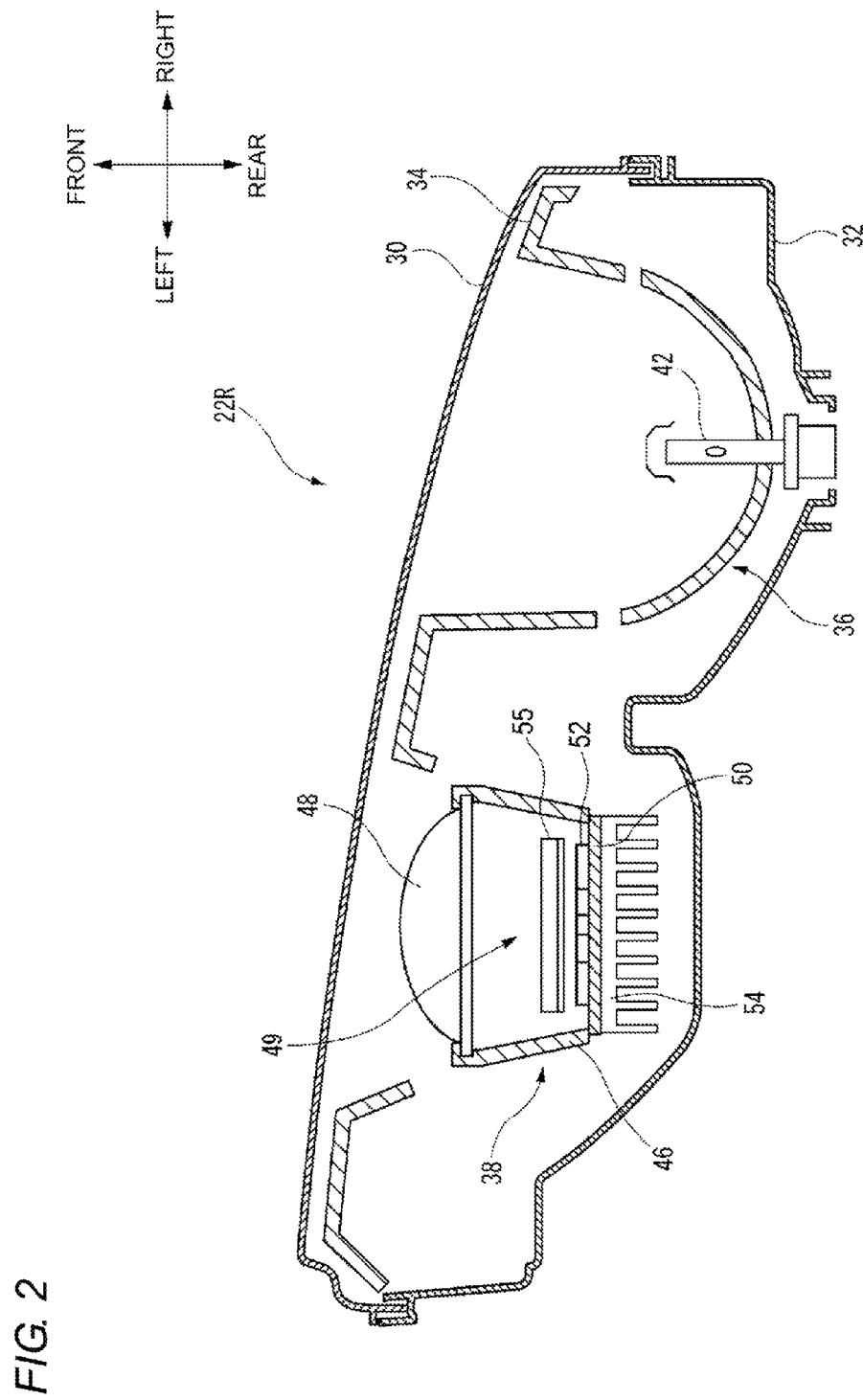
FIG. 2 is a horizontal sectional view showing the configuration of a right headlamp unit shown in FIG. 1.

FIG. 2 shows a section of the right headlamp unit 22R as taken along a horizontal plane and seen from thereabove. The right headlamp unit 22R includes a light transmitting cover 30, a lamp body 32, an extension 34, a first lamp unit 36 and a second lamp unit 38.

The light transmitting cover 30 is formed of a resin having a light transmitting property. The light transmitting cover 30 is mounted on the lamp body 32 and defines a lamp compartment. The first lamp unit 36 and the second lamp unit 38 are disposed in the lamp compartment.

The extension 34 has opening portions which allow light shone from the first lamp unit 36 and the second lamp unit 38 to pass therethrough and is fixed to the lamp body 32. The first lamp unit 36 is disposed further transversely outboards of the vehicle than the second lamp unit 38.

The first lamp unit 36 is a so-called parabola lamp unit and forms a low beam light distribution pattern (a first light distribution pattern), which will be described later. The first lamp unit 36 employs as a light source 42 an incandescent lamp having a filament such as a halogen lamp, an HID (High Intensity Discharge) lamp such as a metal halide lamp, a light emitting diode (LED) or the like.

Figure 3:
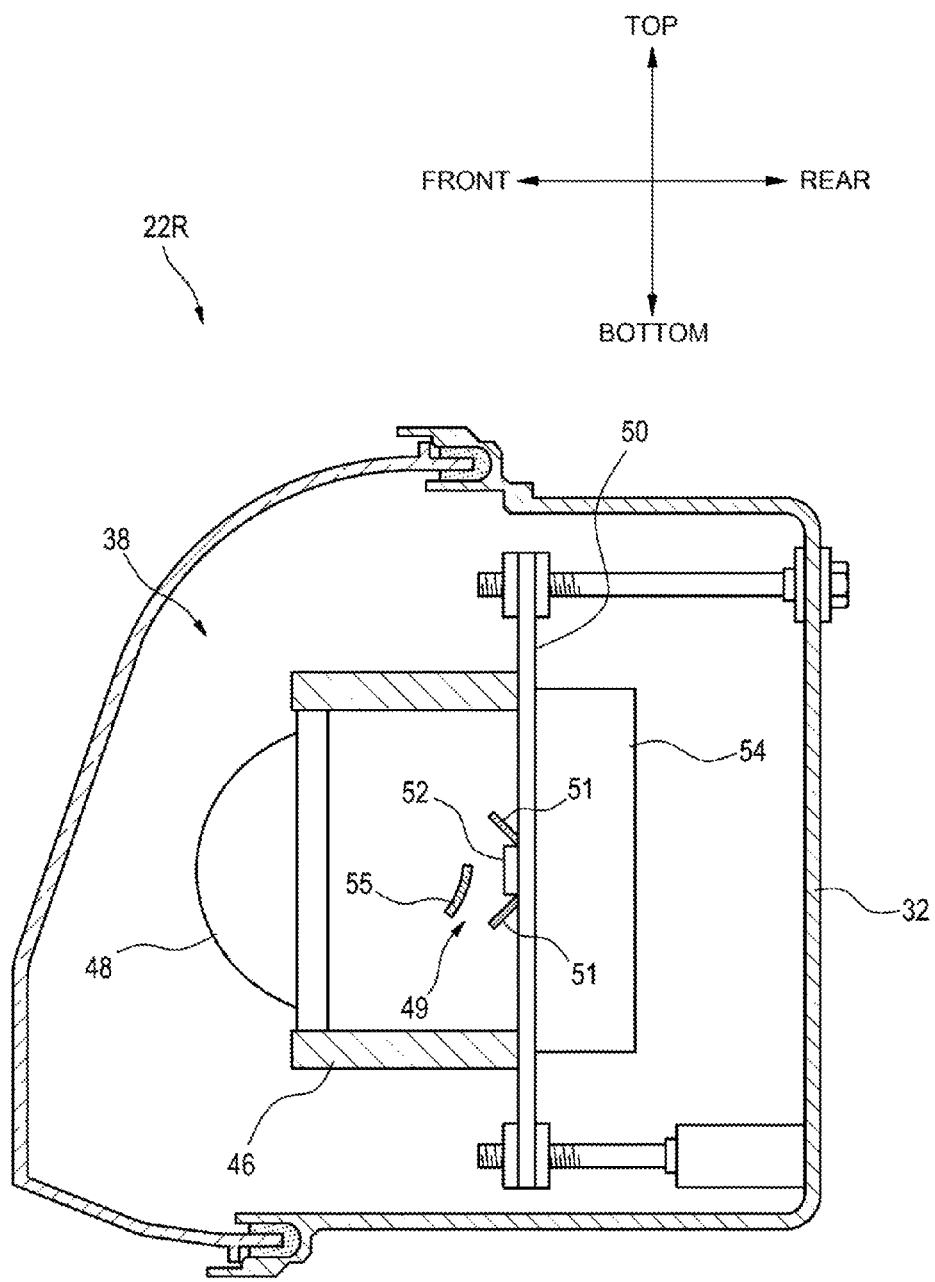
FIG. 3 is a vertical sectional view of a portion of headlamp unit where a second lamp unit is provided.

As shown in FIGS. 2 and 3, the second lamp unit 38 includes a holder 46, a projection lens 48, a light emitting element unit 49, a substrate 50, a heat sink 54 and a movable shade 55.

The projection lens 48 is installed in one of opening portions of the holder 46 having a cylindrical shape. The projection lens 48 is a planoconvex aspheric lens for which a front surface is convex and a rear surface is plane and projects an optical image formed on a rear focal plane thereof to the front of the lamp as an inverted image.

The light emitting element unit 49 is provided on a front surface of the substrate 50, and the heat sink 54 is provided on a rear surface of the substrate 50. The heat sink 54 is formed of metal such as aluminum and has a number of heat dissipating fins.

Figure 4:
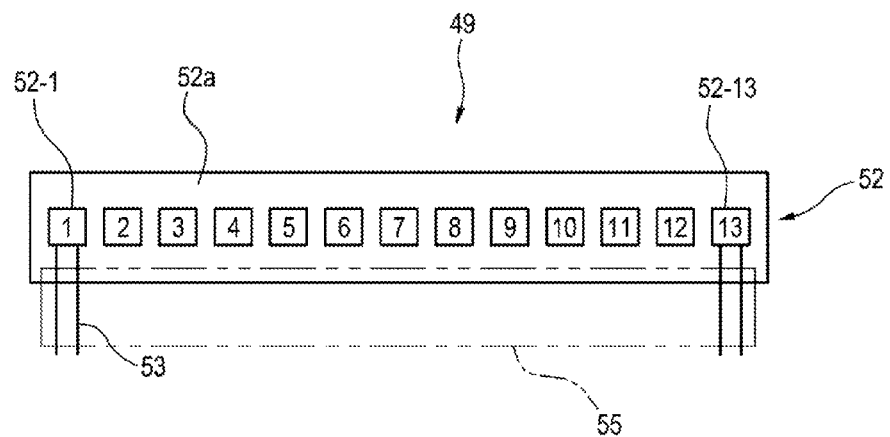
FIG. 4 is a diagram showing schematically the configuration of a light emitting element unit.

FIG. 4 shows a configuration of the light emitting element unit 49 as seen from the front of the vehicle. The light emitting element unit 49 includes a light emitting element array 52 which includes an element substrate 52a which is mounted on the substrate 50. The light emitting element array 52 includes a first semiconductor light emitting element 52-1 to a thirteenth semiconductor light emitting element 52-13 which are arranged sequentially from a right-hand side to a left-hand side of the vehicle.

The semiconductor light emitting elements 52-1 to 52-13 each have a rectangular parallelepiped shape whose height and width are the same. Although its illustration is omitted, the semiconductor light emitting elements 52-1 to 52-13 each have a light source and a thin film. The light source is a white LED (light emitting diode) having a light emitting surface measuring on the order of 1 mm square, and the thin film is provided so as to cover the light emitting surface.

In FIG. 4, the semiconductor light emitting elements 52-1 to 52-13 are numbered, and reference numerals assigned to the second semiconductor light emitting element 52-2 to the twelfth semiconductor light emitting element 52-12 except for the first semiconductor light emitting element 52-1 and the thirteenth semiconductor light emitting element 52-13 are omitted from the illustration. For example, the semiconductor light emitting element denoted by reference numeral 7 denotes the seventh semiconductor light emitting device 52-7.

The semiconductor light emitting elements 52-1 to 52-13 form their own current circuits between the headlamp control unit 20 and themselves via corresponding control lines 53. In FIG. 4, control lines 53 for the second semiconductor light emitting elements 52-2 to the twelfth semiconductor light emitting element 52-12 except for the first semiconductor light emitting element 52-1 and the thirteenth semiconductor light emitting element 52-13 are omitted from the illustration. The headlamp control unit 20 can control the switching on and off of each of the semiconductor light emitting elements 52-1 to 52-13 and the luminous intensity thereof when they are switched on to be lit by adjusting current values supplied thereto through the control lines 53.

As shown in FIGS. 2 and 3, the light emitting unit 49 is disposed in an interior of the holder 46 by installing the substrate 50 in the other opening portion of the holder 46. The plurality of semiconductor light emitting elements 52-1 to 52-13 that the light emitting element unit 49 includes are disposed near a rear focal point of the projection lens 48. When switched on to be illuminated, the plurality of semiconductor light emitting elements 52-1 to 52-13 emit light towards the projection lens 48, and the projection lens 48 projects images formed by the semiconductor light emitting elements 52-1 to 52-13 to the front of the lamp. The plurality of semiconductor light emitting elements 52-1 to 52-13 function as a plurality of light sources. Reflectors 51 are provided at upper and lower sides of the light emitting element unit 49, so that part of light emitted from the light emitting element unit 49 is reflected by the reflectors 51 to be guided to the projection lens 48.

Figure 5:
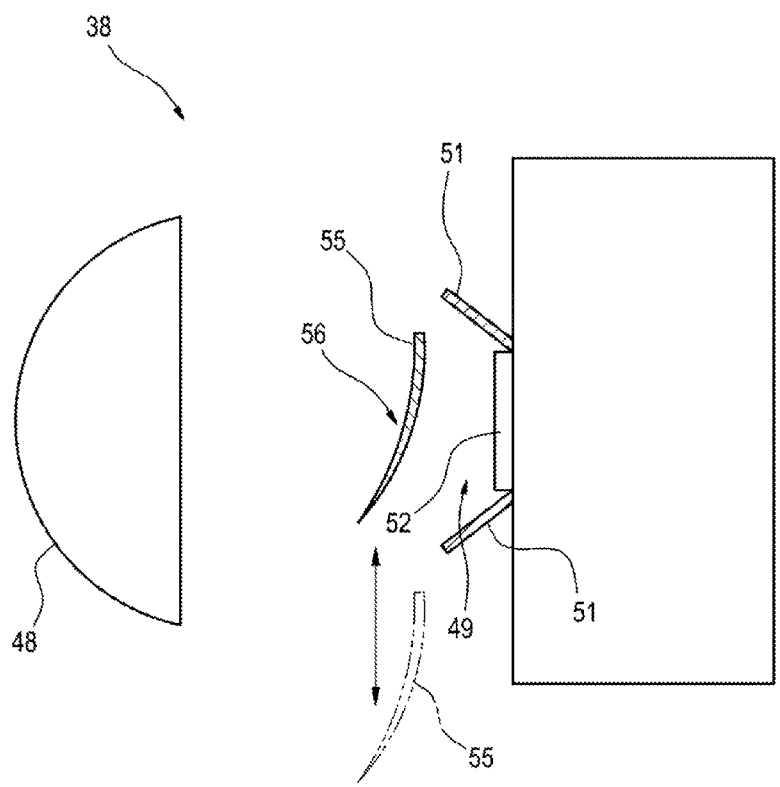
FIG. 5 is a schematic side view showing schematically the configuration of the second lamp unit of the headlamp unit.

As shown in FIGS. 4 and 5, the movable shade 55 is sized so as to cover the whole of front surface sides of the semiconductor light emitting elements 52-1 to 52-13 and is formed into a rectangular plate-like shape when seen from the front thereof. The movable shade 55 is disposed so that its longitudinal direction follows the direction in which the semiconductor light emitting elements 52-1 to 52-13 are arranged. When seen from a side thereof, the movable shade 55 is curved in such a way that a side facing the projection lens 48 is concave into an arc-like shape, and a curved surface which is slightly concave is inclined so as to be oriented obliquely upwards. A portion of the movable shade 55 which faces the projection lens 48 (a portion where the curved surface is formed in this embodiment) is made into a reflecting portion 56.

This movable shade 55 is supported so as to move in an up-to-down direction. A moving mechanism (not shown) is provided on the movable shade 55, so that the movable shade 55 is caused to move between a shading position and a non-shading position by the moving mechanism. The moving mechanism is controlled by the headlamp control unit 20. Specifically, the movable shade 55 can move between the shading position (a position indicated by medium solid lines in FIG. 5) where the movable shade 55 covers the front surface sides of the semiconductor light emitting elements 52-1 to 52-13 and the non-shading position (a position indicted by medium chain double-dashed lines in FIG. 5) where the movable shade 55 withdraws from the front surface sides of the semiconductor light emitting elements 52-1 to 52-13.

When the movable shade 55 is disposed in the shading position, a shading state results where part or the whole of light which is emitted from the semiconductor light emitting elements 52-1 to 52-13 to be incident on the projection lens 48 is cut off, whereas when the movable shade 55 is disposed in the non-shading position, a non-shading state results where the light which is emitted from the semiconductor light emitting elements 52-1 to 52-13 to be incident on the projection lens 48 is not cut off. In the shading state, a cutoff range of the light emitted from the semiconductor light emitting elements 52-1 to 52-13 to be incident on the projection lens 48 varies according to the position of the movable shade 55.

The left headlamp unit 22L is configured so as to be laterally symmetrically with the right headlamp unit 22R, and hence, a detailed description of the left headlamp unit 22L will be omitted here. In the left headlamp unit 22L, too, a first semiconductor light emitting element 52-1 to a thirteenth semiconductor light emitting element 52-13 are arranged sequentially from the right-hand side to the left-hand side of the vehicle. Namely, the configuration of the interior of the second lamp unit 38 of the left headlamp unit 22L is not laterally symmetrical with the configuration of the interior of the second lamp unit 38 of the right headlamp unit 22R.

Figure 6:
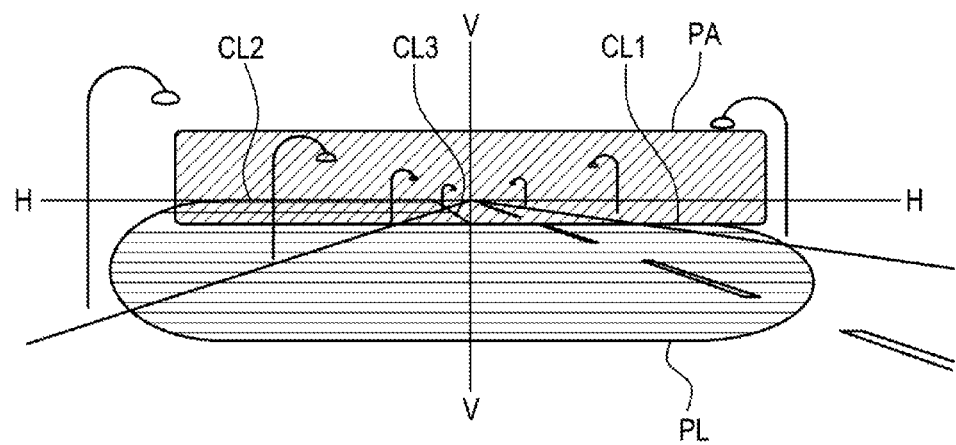
FIG. 6 is a diagram showing schematically light distribution patterns which are formed by light from a headlamp apparatus.

FIG. 6 shows light distribution patterns which are formed, for example, on an imaginary vertical screen disposed 25 meters ahead of the vehicle by a light illuminated forward from the right headlamp unit 22R and the left headlamp unit 22L.

A low beam light distribution pattern PL (an example of a first light distribution pattern) is formed by a combination of light emitted from the first lamp unit 36 of the right headlamp unit 22R and light emitted from a first lamp unit 36 of the left headlamp unit 22L. The low beam light distribution pattern PL is a low beam light distribution pattern for vehicles driving on the left and has a first cut-off line CL1 to a third cut-off line CL3 at an upper end edge thereof. The first cut-off line CL1 to the third cut-off line CL3 extend in a horizontal direction so as to differ in level on a left-hand side and a right-hand side of a V-V line which is a vertical line passing through a focal point ahead of the lamp.

The first cut-off line CL1 is used as an oncoming vehicle's lane side cut-off line. The third cut-off line CL3 extends obliquely upwards and leftwards from a left end portion of the first cut-off line CL1. The second cut-off line CL2 extends on a line H-H from a left-hand side of a point of intersection between the third cut-off line CL3 and the H-H line. Namely, the second cut-off line CL2 is used as a subject vehicle's lane side cut-off line.

An additional light distribution pattern PA (a second light distribution pattern) is defined as a light distribution pattern which is formed by light emitted from all the semiconductor light emitting elements 52-1 to 52-13 that the second lamp units 38 of the right headlamp unit 22R and the left headlamp unit 22L include.

The additional light distribution pattern PA is formed into a belt-like shape which extends in the horizontal direction so that a lower end thereof is positioned on the first cut-off line CL1 while including the horizontal line (the H-H line). This additional light distribution pattern PA forms a high beam light distribution pattern together with the low beam light distribution pattern PL. Namely, the second lamp units 38 function as light sources for a high beam, and the additional light distribution pattern PA formed by the second lamp units 38 constitutes part of the high beam light distribution pattern.

In the configuration of the vehicle lamp control system 11, the shape of the additional light distribution pattern PA is changed by combining the control of the switching on and off of the semiconductor light emitting elements 52-1 to 52-13 and the control of the cutoff range of the light emitted from the semiconductor light emitting elements 52-1 to 52-13 by the movable shade 55 so as to restrict the generation of glare to pedestrians and occupants of an oncoming vehicle.

Figure 7:
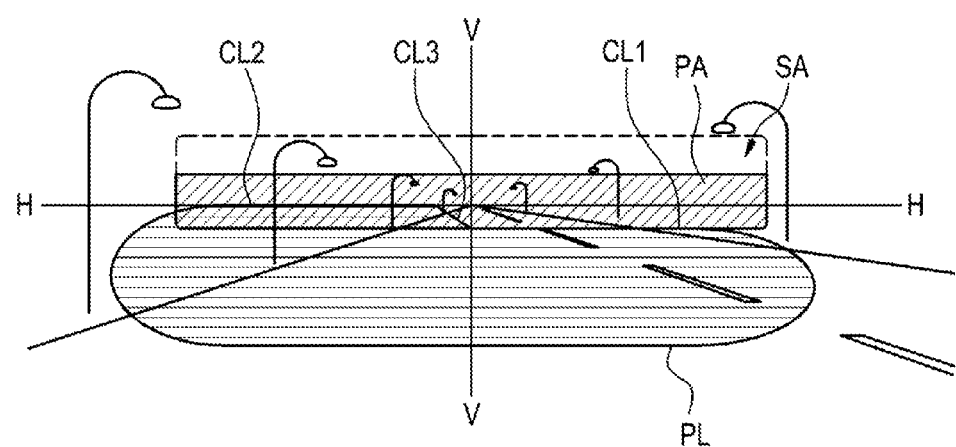
FIG. 7 is a diagram showing schematically light distribution patterns which are formed by light from the headlamp apparatus.

For example, when detecting a pedestrian or an oncoming vehicle, the headlamp control unit 20 controls the moving mechanism to thereby move the movable shade 55 disposed in the non-shading position from a lower side to an upper side in the up-to-down direction so as to dispose the movable shade 55 in the shading position where the movable shade 55 is interposed between the semiconductor light emitting elements 52-1 to 52-13 and the projection lens 48. Then, as shown in FIG. 7, the additional light distribution pattern PA is shaded from an upper side thereof to thereby form a shade area SA, whereby a head portion of the pedestrian and an occupant of the oncoming vehicle are shielded from light from the second lamp units 38, the generation of glare to the pedestrian and the occupant of the oncoming vehicle being thereby restricted.

Incidentally, when the movable shade 55 is disposed in the non-shading position which is the withdrawal position of the movable shade 55, the front surface sides of the semiconductor light emitting elements 52-1 to 52-13 are left open. Consequently, sunlight is collected to the projection lens 48 and is then shone on to the semiconductor light emitting elements 52-1 to 52-13 during daytime. Then, the semiconductor light emitting elements 52-1 to 52-13 are deteriorated or damaged by the sunlight collected to the projection lens 48 and the heat of the sunlight so collected, leading to fears that the illumination efficiency of the semiconductor light emitting elements 52-1 to 52-13 is reduced.

Figure 8:
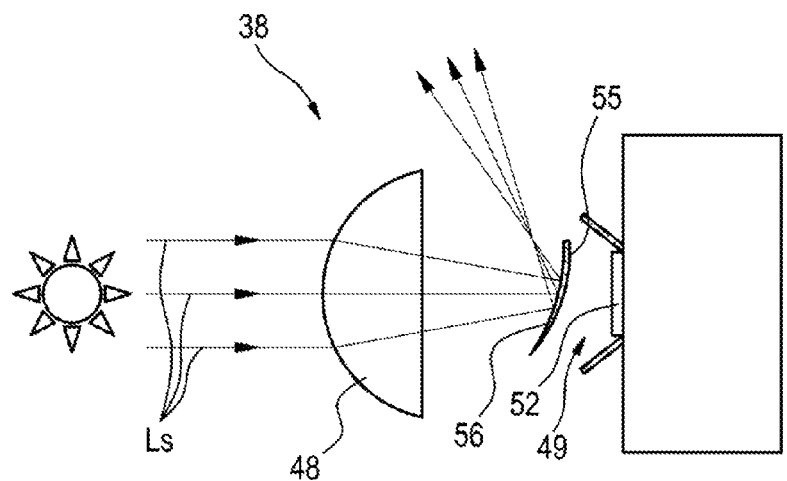
FIG. 8 is a schematic side view of the second lamp unit of the headlamp unit.

Because of this, in the vehicle lamp control system 11 according to this embodiment, the headlamp control unit 20 controls the moving mechanism so as to move the movable shade 55 to the shading position in the event that the semiconductor light emitting elements 52-1 to 52-13 are left switched off as shown in FIG. 8. In the second lamp unit 38, this causes the sunlight Ls collected by the projection lens 48 to be cut off by the movable shade 55, whereby the sunlight Ls is prevented from being shone on to the semiconductor light emitting elements 52-1 to 52-13. The sunlight Ls which is shone on to the movable shade 55 is reflected by the reflecting portion 56 of the movable shade 55 which is formed on the side facing the projection lens 48 and is then guided obliquely upwards. This restricts the light reflected by the movable shade 55 from being shone on to the front of the vehicle 10 to dazzle an oncoming vehicle.

Thus, as has been described heretofore, according to the vehicle lamp control system 11 of this embodiment, in the event that the semiconductor light emitting elements 52-1 to 52-13 are left switched off, the movable shade 55 is moved to the shading position. This causes the movable shade 55 to cut off the sunlight Ls collected by the projection lens 48, thereby making it possible to prevent the sunlight Ls from being shone on to the semiconductor light emitting elements 52-1 to 52-13. Consequently, it is possible to restrict the semiconductor light emitting elements 52-1 to 52-13 from being deteriorated or damaged by the sunlight Ls collected by the projection lens 48 and the heat of the sunlight Ls so collected. Namely, the semiconductor light emitting elements 52-1 to 52-13 can be protected from the sunlight Ls so as to maintain the illumination efficiency of the semiconductor light emitting elements 52-1 to 52-13.

Second Embodiment

Next, a vehicle lamp control system 11 according to a second embodiment will be described.

Figure 9:
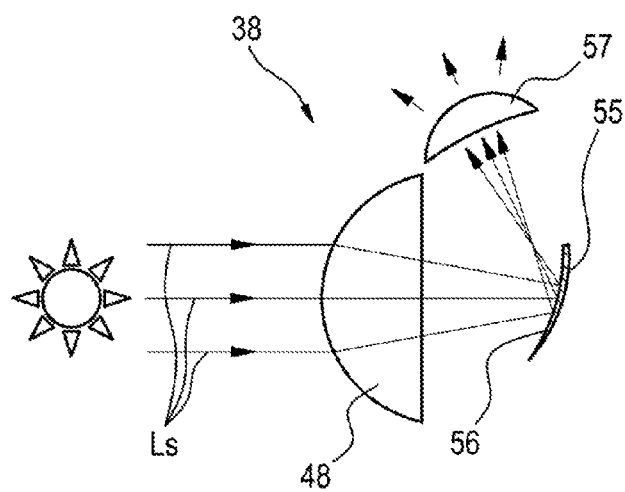
FIG. 9 is a schematic side view of a second lamp unit of a headlamp unit of a vehicle lamp control system according to a second embodiment.

FIG. 9 is a schematic side view of a second lamp unit of a headlamp unit of the vehicle lamp control system according to the second embodiment.

As shown in FIG. 9, in the vehicle lamp control system 11 according to the second embodiment, the second lamp unit 38 includes an optical member 57. This optical member 57 is formed of transparent resin or glass and transmits at least part of light incident thereon. The optical member 57 has a curved surface on an upper surface side and a substantially flat shape on a lower surface side and is disposed obliquely above a movable shade 55. Thus, the optical member 57 is disposed in a position where sunlight Ls which is transmitted through a projection lens 48 to be reflected by a reflecting portion 56 of the movable shade 55 which is caused to move to a shading position by a headlamp control unit 20 can be incident on the optical member 57.

In the case of the vehicle lamp control system 11 according to the second embodiment, too, with semiconductor light emitting elements 52-1 to 52-13 left switched off, the headlamp control unit 20 controls a moving mechanism so as to move the movable shade 55 to the shading position. This causes the movable shade 55 to cut off the sunlight Ls collected by the projection lens 48, whereby the sunlight Ls is prevented from being shone on to the semiconductor light emitting elements 52-1 to 52-13.

In the vehicle lamp control system 11 according to the second embodiment, the sunlight Ls shone on to the movable shade 55 is reflected by the reflecting portion 56 of the movable shade 55 which lies on a side facing the projection lens 48 and is then guided obliquely upwards to thereby be shone on to the optical member 57. Then, the light shone on to the optical member 57 passes through the optical member 57. The light that passes through the optical member 57 spreads outwards.

In this way, in the vehicle lamp control system 11 according the second embodiment, the optical member 57 is provided further in addition to the configuration of the first embodiment. This enables the light reflected by the reflecting portion 56 of the movable shade 55 to be shone towards the optical member 57, so that the light is then allowed to pass through the optical member 57 to thereby spread to the circumference of the optical member 57. This can improve the design of a headlamp unit 22 during daytime by making use of the sunlight Ls. Although the optical member 57 is described as being formed of transparent resin or glass so as to transmit light, the invention is not limited thereto. The optical member 57 may be, for example, a reflector having a reflecting surface which can reflect light reflected by the reflecting portion 56 of the movable shade 55 in a predetermined direction. In this configuration, too, it is possible to improve the design of the headlamp unit 22 during day time by making use of sunlight Ls.

Third Embodiment

Next, a vehicle lamp control system 11 according to a third embodiment will be described.

Figure 10:
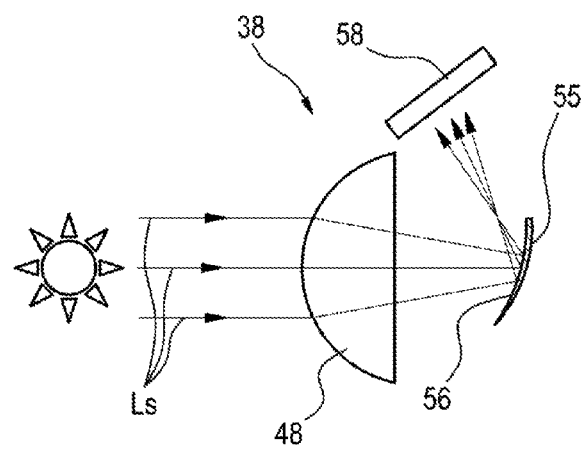
FIG. 10 is a schematic side view of a second lamp unit of a headlamp unit of a vehicle lamp control system according to a third embodiment.

FIG. 10 is a schematic side view of a second lamp unit of a headlamp unit of the vehicle lamp control system according to the third embodiment.

As shown in FIG. 10, in the vehicle lamp control system 11 according to the third embodiment, the second lamp unit 38 includes a solar battery module 58. This solar battery module 58 includes a generating device which converts light shone on to the solar battery module 58 into electricity. This solar battery module 58 is disposed obliquely above a movable shade 55. Thus, the solar battery module 58 is disposed in a position where the solar battery module 58 can receive sunlight Ls which is transmitted through a projection lens 48 to be reflected by a reflecting portion 56 of the movable shade 55 which is caused to move to a shading position by a headlamp control unit 20.

In the case of the vehicle lamp control system 11 according to the third embodiment, too, with semiconductor light emitting elements 52-1 to 52-13 switched off, the headlamp control unit 20 controls a moving mechanism so as to move the movable shade 55 to the shading position, whereby the sunlight Ls which is collected by the projection lens 48 is cut off by the movable shade 55 so that the sunlight Ls is prevented from being shone on to the semiconductor light emitting elements 52-1 to 52-13.

In addition, in the vehicle lamp control system 11 according to the third embodiment, the sunlight Ls shone on to the movable shade 55 is reflected by the reflecting portion 56 of the movable shade 55 which lies on a side facing the projection lens 48 and is then guided obliquely upwards. The sunlight Ls is then shone on to the solar battery module 58, whereby electricity is generated by the generating device of the solar battery module 58.

In this way, in the vehicle lamp control system 11 according to the third embodiment, in addition to the configuration of the first embodiment, the solar battery module 58 is provided further. This allows the sunlight Ls which is reflected by the reflecting portion 56 of the movable shade 55 to be received by the solar battery module 58, which then generates electricity by making use of the sunlight Ls. This enables solar energy to be made effective use of during daytime.

Next, various modified examples will be described.

Modified Example 1

Figure 11:
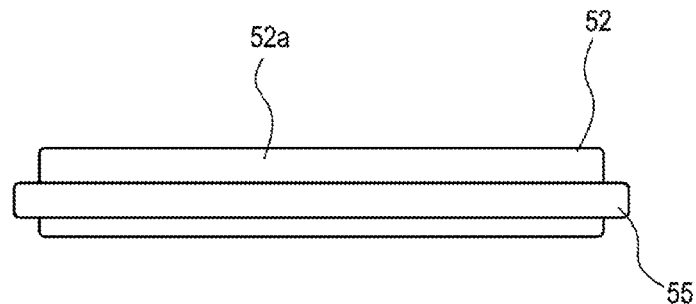
FIG. 11 is a schematic front view of a light emitting element array of a second lamp unit according to a modified example 1 having a movable shade of a different form.
Figure 12:
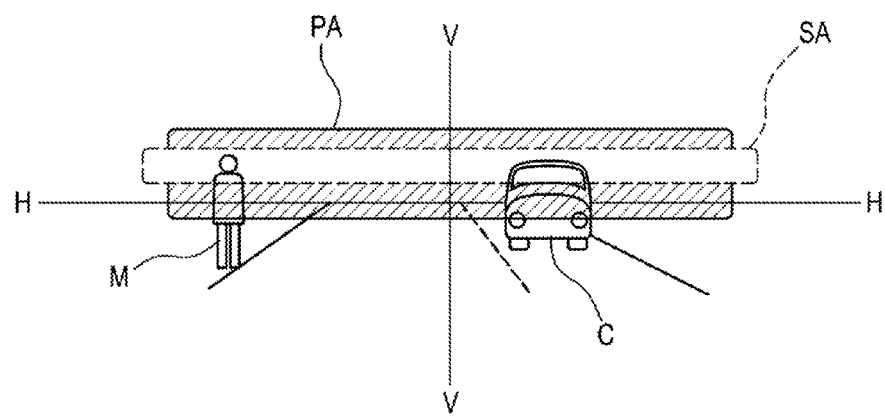
FIG. 12 is a diagram showing schematically a light distribution pattern in the modified example 1.

FIG. 11 is a diagram explaining a modified example 1 and shows a schematic front view of a light emitting element array of a second lamp unit. FIG. 12 is a diagram showing schematically a light distribution pattern formed by the modified example 1.

As shown in FIG. 11, in the modified example 1, a movable shade 55 is provided whose vertical width dimension is small. The movable shade 55 has a width dimension which is something like a width which shields a vertical portion of a light shining or illumination area formed by the light emitting element array 52. For example, the vertical width dimension of the movable shade 55 is smaller than a vertical width dimension of an element substrate 52a on which semiconductor light emitting elements 52-1 to 52-13 are mounted. The movable shade 55 may be a plate-like shade or a rod-like shade.

In second lamp units 38 which each include the movable shade 55 described above, for example, in driving in an urban area, a headlamp control unit 20 controls moving mechanisms based on information from wheel speed sensors 16, a camera 18 or a navigation system 19 so as to dispose the movable shades 55 in their desired shading position, whereby as shown in FIG. 12, only a portion of the illumination area which corresponds to a portion lying in the vicinity of a head portion of a pedestrian M and a portion lying in the vicinity of an occupant of a vehicle C such as an oncoming vehicle can be shielded from light emitted from headlamp units 22. Consequently, with the modified example 1, it is possible to illuminate a wide range without cutting off light unnecessarily while restricting the generation of glare to the pedestrian M and the occupant of the vehicle C. The luminous intensity of light shone on to the pedestrian M may be enhanced by controlling the flow of electric current to the light emitting element array 52 made up of the semiconductor light emitting elements 52-1 to 52-13. In this way, even though the luminous intensity of the light shone on to the portion corresponding to the pedestrian M is enhanced, since the light to be shone on to the portion of the illumination area which lies in the vicinity of the head portion of the pedestrian M is cut off by the movable shade 55, the generation of glare to the pedestrian M can be restricted, and the pedestrian M can be visualized more easily by the enhancement of the luminous intensity of the light shone on to the pedestrian M.

Modified Example 2

Figure 13:
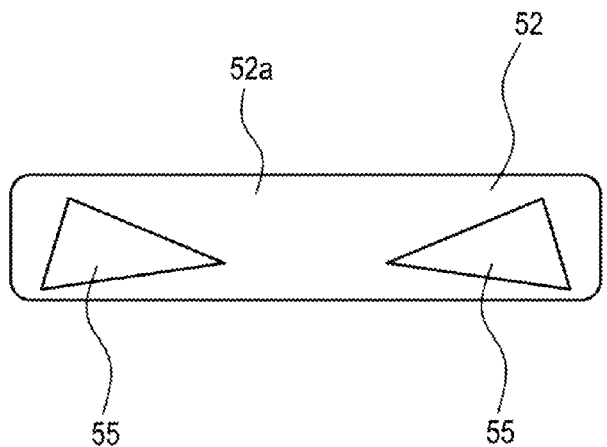
FIG. 13 is a schematic front view of a light emitting element array of a second lamp unit according to a modified example 2 having a movable shade of a different form.
Figure 14:
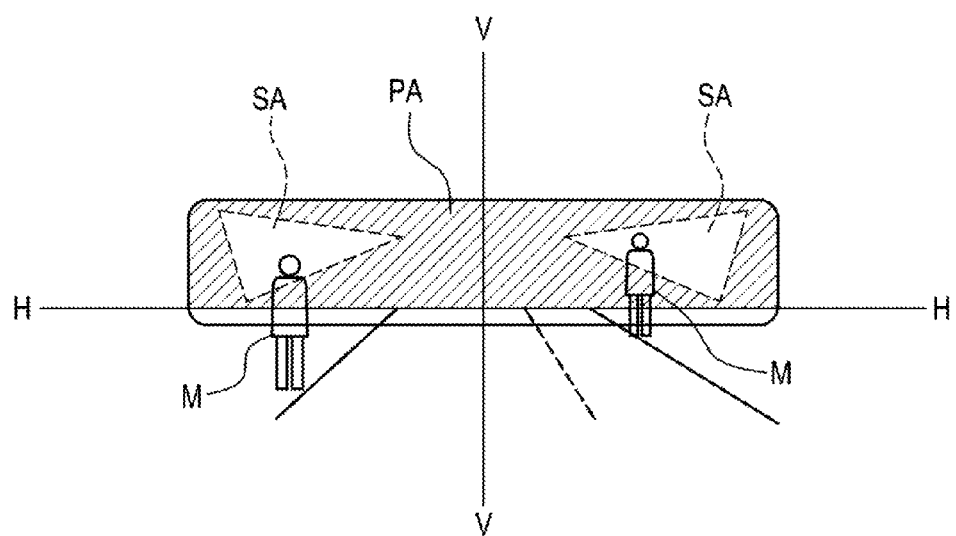
FIG. 14 is a diagram showing schematically a light distribution pattern in the modified example 2.

FIG. 13 is a diagram explaining a modified example 2, which shows a schematic front view of a light emitting element array of a second lamp unit. FIG. 14 is a diagram showing schematically a light distribution pattern formed by the second modified example 2.

As shown in FIG. 13, in the second modified example 2, two triangular movable shades 55 are provided. These movable shades 55 are disposed so as to be spaced apart from each other and are also disposed so that acute angled corner portions are located inwards to be oriented towards a central portion of the light emitting element array 52.

In second lamp units 38 which each include the movable shades 55 described above, a headlamp control unit 20 controls moving mechanisms based on information from wheel speed sensors 16, a camera 18 or a navigation system 19 so as to dispose the movable shades 55 in their desired shading position, whereby as shown in FIG. 14, a triangular shade area SA is formed on either side of a road. In each of these shade areas SA, a vertical dimension is increased gradually as the triangular shade area SA extends from a central portion towards an outer side of the road with a lower side portion of the triangular shade area SA disposed along the road. The shade areas SA formed as described above shield individually a portion lying in the vicinity of a head portion of a pedestrian M standing on a roadside on either side of the road irrespective of a distance along a traveling direction of the vehicle. Consequently, with the modified example 2, it is possible to illuminate a wide range without cutting off light unnecessarily while restricting the generation of glare to the pedestrian M on the roadside on either side of the road.

Modified Example 3

Figure 15:
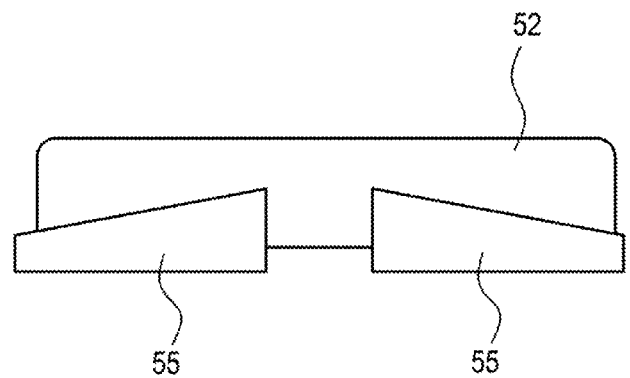
FIG. 15 is a schematic front view of a light emitting element array of a second lamp unit according to a modified example 3 having a movable shade of a different form.
Figure 16:
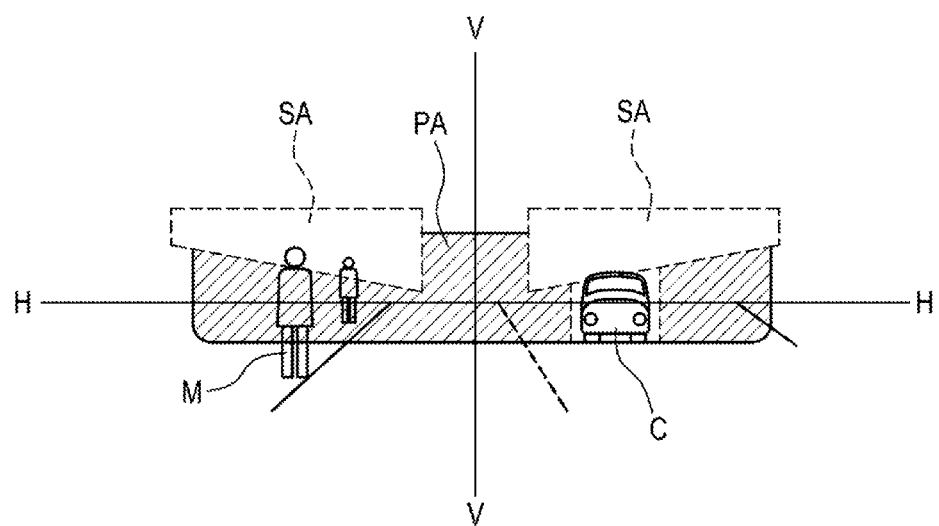
FIG. 16 is a diagram showing schematically a light distribution pattern in the modified example 3.

FIG. 15 is a diagram explaining a modified example 3, which shows a schematic front view of a light emitting element array of a second lamp unit. FIG. 16 is a diagram showing schematically a light distribution pattern formed by the modified example 3.

As shown in FIG. 15, in the modified example 3, two quadrangular movable shades 55 are provided. These movable shades 55 are disposed so as to be spaced apart from each other. In each of the movable shades 55, an upper side is gradually inclined downwards as it extends from a central portion to an outer side of the light emitting element array 52.

In second lamp units 38 which each include the movable shades 55 described above, a headlamp control unit 20 controls moving mechanisms based on information from wheel speed sensors 16, a camera 18 or a navigation system 19 so as to dispose the movable shades 55 in their desired shading position, whereby as shown in FIG. 16, a quadrangular shade area SA is formed on either side of a road. In each of these shade areas SA, a vertical dimension is decreased gradually as the quadrangular shade area SA extends from a central portion towards an outer side of the road with a lower side portion of the quadrangular shade area SA inclined upwards from a far side towards a near side of the road. These shade areas SA formed in the way described above shield individually portions lying in the vicinity of head portions of a plurality of pedestrians M standing on roadsides on both sides of the road. Consequently, it is possible to ensure the visibility of a driver ahead of the vehicle without cutting off light unnecessarily in a central portion of a light shining or illumination area formed by headlamp units while restricting the generation of glare to the plural pedestrians M on the roadside of the road. In addition, by controlling the switching on and off of the light emitting element arrays 52 each made up of semiconductor light emitting elements 52-1 to 52-13, the semiconductor light emitting elements which emit light to portions corresponding to vehicles C such as a preceding vehicle and an oncoming vehicle are switched off, thereby making it possible to restrict the generation of glare to occupants of the vehicles C like the preceding vehicle and the oncoming vehicle.

Modified Example 4

Figure 17:
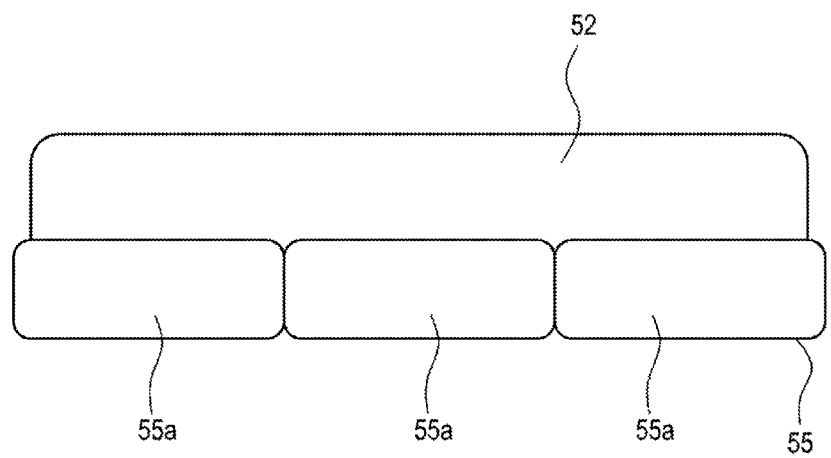
FIG. 17 is a schematic front view of a light emitting element array of a second lamp unit according to a modified example 4 having a movable shade of a different form.
Figure 18:
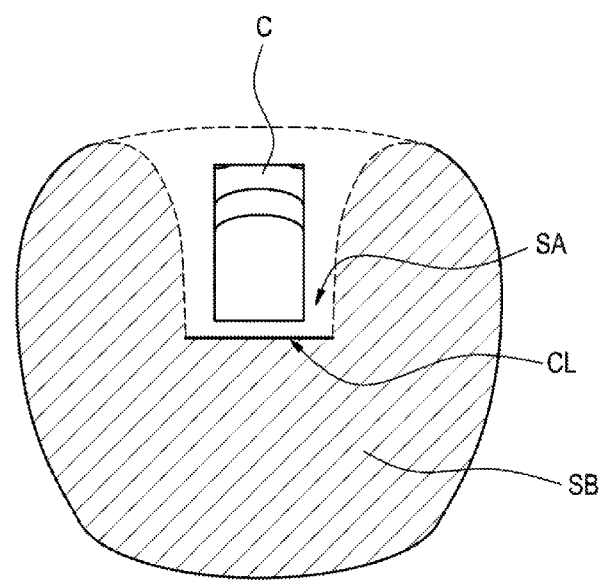
FIG. 18 is a diagram showing schematically an illumination area and a non-illumination area in the modified example 4.
Figure 19:
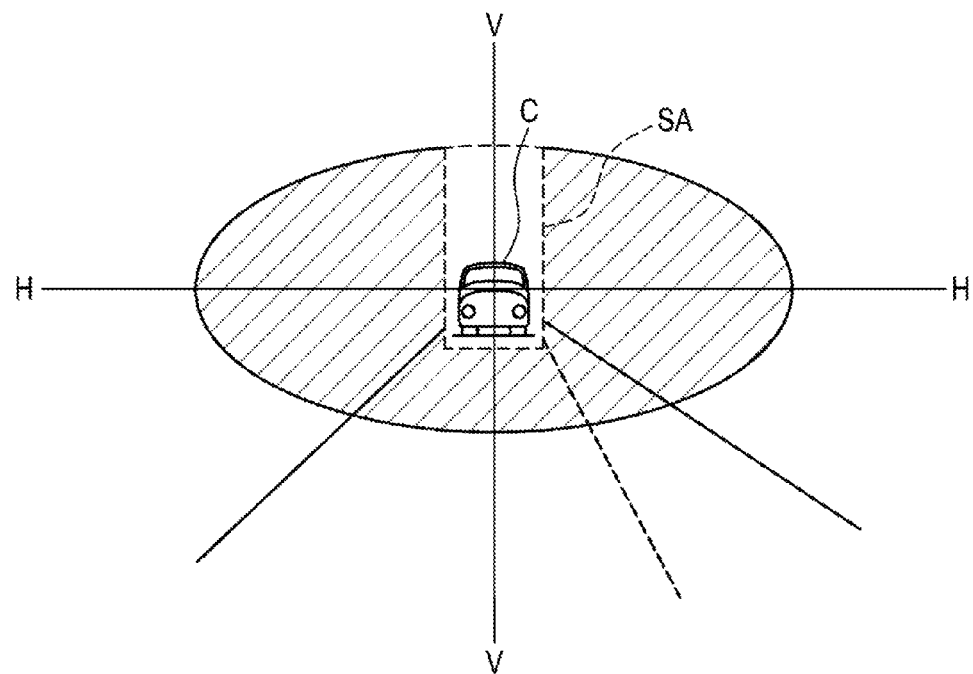
FIG. 19 is a diagram showing schematically a light distribution pattern in the modified example 4.
Figure 20:
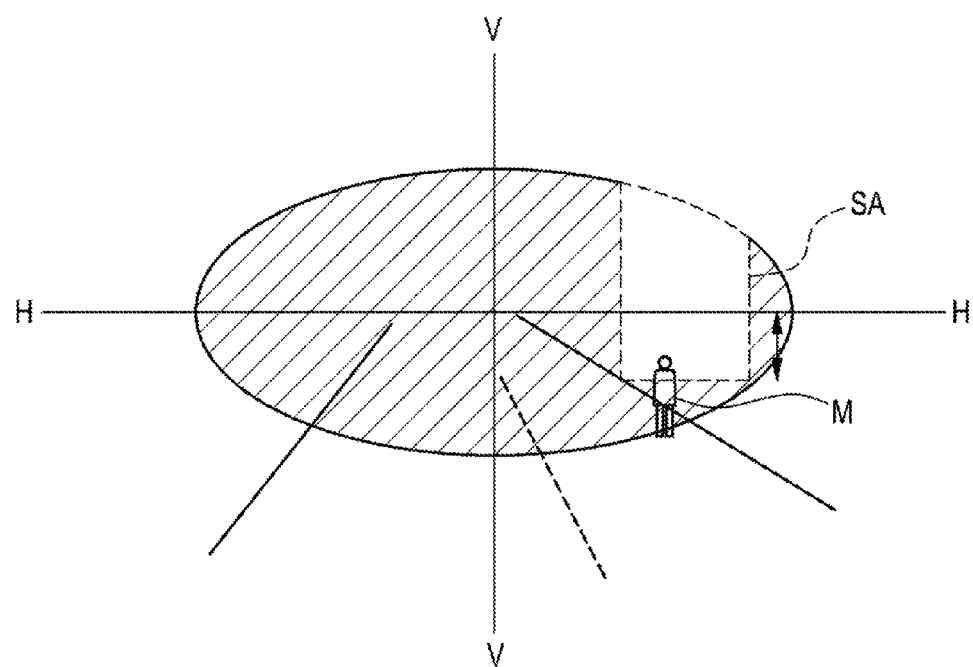
FIG. 20 is a diagram showing schematically a light distribution pattern in the modified example 4.

FIG. 17 is a diagram explaining a modified example 4, which shows a schematic front view of a light emitting element array of a second lamp unit. FIG. 18 is a diagram showing schematically a light distribution pattern formed by the modified example 4. FIG. 19 is a diagram showing schematically a light distribution pattern formed by the modified example 4. FIG. 20 is a diagram showing schematically a light distribution pattern formed by the modified example 4.

As shown in FIG. 17, in the modified example 4, a movable shade 55 is provided which is made up of three divided shades 55a which are divided in a horizontal direction. These divided shades 55a are moved independently in an up-to-down direction by a headlamp control unit 20.

In this way, in second lamp units 38 each including the movable shade 55 made up of the plurality of divided shades 55a, a headlamp control unit 20 controls moving mechanisms based on information from wheel speed sensors 16, a camera 18 or a navigation system 19 so as to dispose the divided shades 55a of the movable shades 55 in their desired shading position, whereby a shade area SA is formed in a light shining or illumination area SB. As this occurs, in the event that a preceding vehicle C exits ahead of the subject vehicle, the headlamp control unit 20 moves the divided shades 55a of the movable shade 55 independently in the up-to-down direction, whereby as shown in FIG. 18, a cut-off line CL for the shade area SA is formed behind the preceding vehicle C. Then, the driver of the subject vehicle can recognize well the existence of the preceding vehicle C and can maintain an appropriate distance between the preceding vehicle C and itself. In this way, with the modified example 4, it is possible to illuminate a wide range to enhance the visibility of a far area ahead of the subject vehicle while enhancing the recognition of the existence of the preceding vehicle C.

In addition, in the modified example 4, only the portion corresponding to the preceding vehicle C is shielded as shown in FIG. 19 by causing the headlamp control unit 20 to move only the central divided shade 55a of the movable shade 55 in the up-do-down direction. According to this configuration, it is possible to illuminate the wide range by cutting off as little light as possible unnecessarily to enhance the visibility of a far area ahead of the subject vehicle while restricting the generation of glare to an occupant of the preceding vehicle C. As the means for forming the shade area shown in FIG. 19, in addition to the three divided shades of this modified example, a single movable shade may be used which can shield the central portion of the illumination area.

Further, in the modified example 4, the headlamp control unit 20 moves anyone of the divided shades 55a of the movable shade 55 independently in the up-to-down direction, whereby a portion including a head portion of a pedestrian M standing on a roadside is shielded as shown in FIG. 20. In addition, the headlamp control unit 20 moves up and down the divided shade 55a which shields the portion including the head portion of the pedestrian M repeatedly in the up-to-down direction, whereby light is allowed to and prohibited from being shone on to the portion including the head portion of the pedestrian M. This enables as wide a range as possible to be illuminated to enhance the visibility in the range while restricting the generation of glare to the pedestrian M within a short period of time.

Modified Example 5

Figure 21:
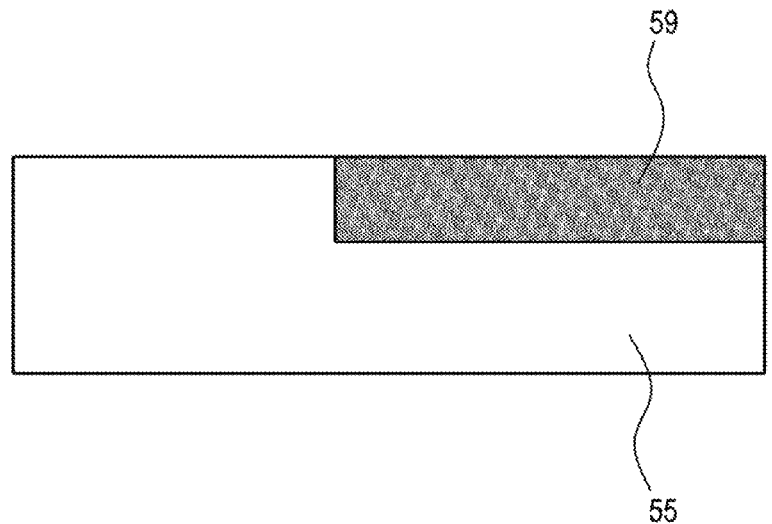
FIG. 21 is a schematic front view of a movable shade of a second lamp unit according to a modified example 5 having the movable shade of a different form.
Figure 22:
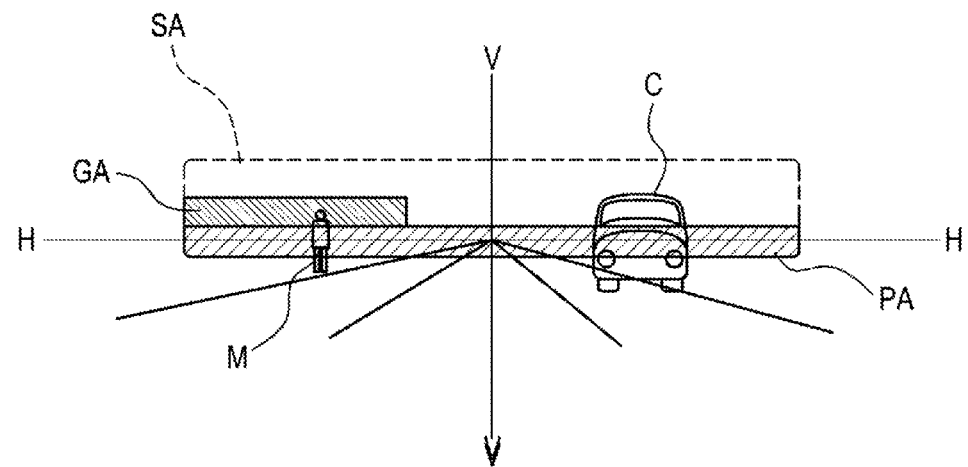
FIG. 22 is a diagram showing schematically a light distribution pattern in the modified example 5.

FIG. 21 is a schematic front view of a movable shade of a second lamp unit to describe a modified example 5. FIG. 22 is a diagram showing schematically a light distribution pattern to describe the modified example 5.

As shown in FIG. 21, in the modified example 5, a movable shade 55 having a translucent portion 59 is provided. The translucent portion 59 is made up of a translucent color filter which is colored, for example, magenta or the like and is provided at an upper right-hand side of the movable shade 55. In this translucent portion 59, a portion of light emitted from a light emitting element array 52 which is in a certain wavelength range is absorbed.

In second lamp units 38 which each include the movable shade 55 described above, a headlamp control unit 20 controls moving mechanisms based on information from wheel speed sensors 16, a camera 18 or a navigation system 19 so as to dispose the movable shades 55 in their desired shading position, whereby a shade area SA is formed ahead of headlamp units as shown in FIG. 22. A dimly lit area GA on to which light that has passed through the translucent portion 59 is shone is formed at a lower left-hand side of the shade area SA. In this modified example, the dimly lit area GA is formed on a left-hand side of a road so as to be located near a head portion of a pedestrian M standing on a roadside on the left-hand side of the road. Consequently, a driver of the subject vehicle can recognize a whole body of the pedestrian M to find him or her early while restricting the generation of glare to the pedestrian M standing on the roadside of the road. In particular, in case the color filter of the translucent portion 59 is colored magenta or the like, the face of the pedestrian M can be recognized more easily when the light that has passed through the translucent portion 59 is shone on to the face of the pedestrian M.

Figure 23:
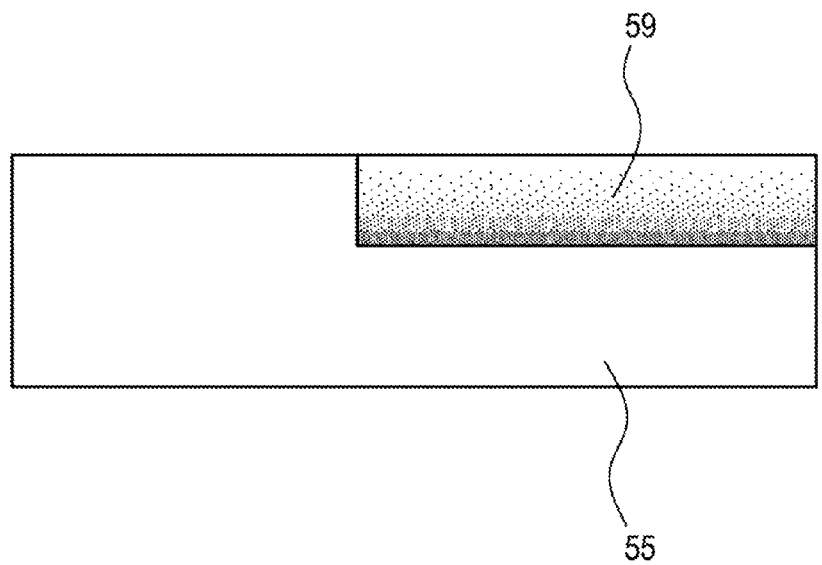
FIG. 23 is a schematic front view of another movable shade according to the modified example 5.
Figure 24:
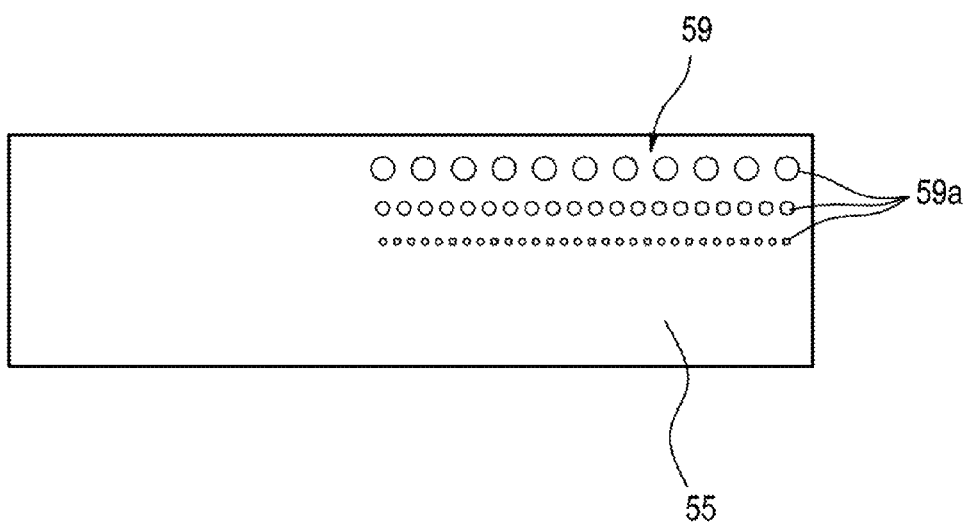
FIG. 24 is a schematic front view of a further movable shade according to the modified example 5.

FIG. 23 is a schematic front view of another movable shade according to the modified example 5. FIG. 24 is a schematic front view of a further movable shade according to the modified example 5.

The translucent portion 59 of the movable shade 55 is not limited to the color filter. For example, as shown in FIG. 23, an ND (Natural Density) filter may be used as a translucent portion 59. In the event that a translucent portion 59 made up of an ND filter is provided, it is desirable that the density is gradually reduced at the translucent portion 59 extends upwards. By adopting this configuration, a dimly lit area GA formed in the shade area SA becomes gradually brighter as the dimly lit area GA extends downwards, so that a cut-off line between the shade area SA and the dimly lit area GA gets blurred, whereby a sensation of physical disorder felt by the driver when looking at the dimly lit area GA can be mitigated. This can make it difficult for the pedestrian M to be subjected to a drastic change in brightness which would be produced when the shining direction of light changes vertically as a result of a vehicle 10 pitching. In addition, an arrangement of a plurality of hole portions 59a may be used as a translucent portion 59 as shown in FIG. 24. In the translucent portion 59 where the plurality of hole portions 59a are arranged in rows, it is desirable that the sizes of the hole portions 59a arranged in rows gradually get greater towards upper rows. By adopting this configuration, a dimly lit area GA formed in the shade area SA gets gradually brighter as the dimly lit area GA extends downwards, so that a cut-off line between the shade area SA and the dimly lit area GA gets blurred, whereby a sensation of physical disorder felt by the driver when looking at the dimly lit area GA can be mitigated. This can make it difficult for the pedestrian M to be subjected to a drastic change in brightness which would be produced when the shining direction of light changes vertically as a result of a vehicle 10 pitching.

Fourth Embodiment

Next, a vehicle lamp control system 11 according to a fourth embodiment will be described. A basic configuration of a vehicle is similar to that of the vehicle of the first embodiment described by reference to FIGS. 1 to 7, and hence, the description of the basic configuration of the vehicle will be omitted here.

Figure 25:
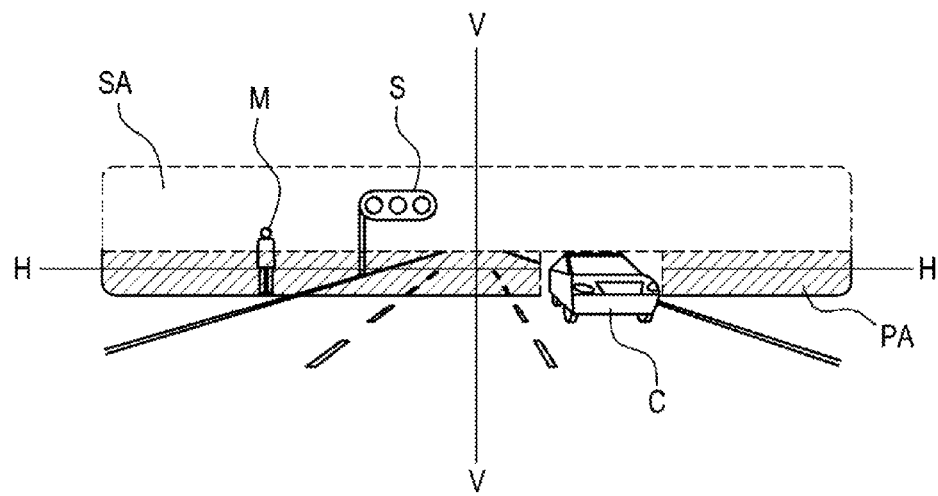
FIG. 25 shows an example of illumination light which is controlled by a vehicle lamp control system according to a fourth embodiment.

FIG. 25 shows an example of illumination light which is controlled by the vehicle lamp control system 11 of this embodiment. In the vehicle clamp control system 11, a headlamp control unit 20 controls the movement of movable shades 55 based on information from wheel speed sensors 16, a camera 18 or a navigation system 19, whereby a shade area SA is formed as shown in FIG. 25. This restricts light from being shone on to a traffic signal S and a head portion of a pedestrian M to thereby restrict glare to a driver of a subject vehicle due to light reflected by the traffic signal and glare to the pedestrian M. In addition, the headlamp control unit 20 controls light emitting element arrays 52 so as to switch off semiconductor light emitting elements configured to illuminate a portion corresponding to an oncoming vehicle C. This restricts glare to an occupant of the oncoming vehicle C. The headlamp control unit 20 controls the light emitting element arrays 52 so as to enhance the luminous intensity of light to be shone on to left and right roadsides. This makes the roadsides visible to the driver. In particular, the luminous intensity of light to be shone on to pedestrians M standing on the roadsides is enhanced more, and this makes the pedestrians M more visible to the driver.

Next, the control of a second lamp unit 38 in the vehicle lamp control system 11 configured in the way described above will be described.

When a signal is transmitted thereto which signals a command to switch on the second lamp unit 38, the headlamp control unit 20 first controls a moving mechanism so as to move the movable shade 55 towards its shading position, whereby the movable shade 55 is disposed in the shading position.

In this state, the headlamp control unit 20 feeds semiconductor light emitting elements 52-1 to 52-13 of the light emitting element array 52 to switch on the semiconductor light emitting elements 52-1 to 52-13. As this occurs, since the movable shade 55 is disposed in the shading position, no light is shone from the second lamp unit 38 to an area lying ahead of the vehicle, and hence, no additional light distribution pattern PA is formed.

After having switched on the semiconductor light emitting elements 52-1 to 52-13, the headlamp control unit 20 controls the moving mechanism to move the movable shade 55 towards a non-shading position, whereby the movable shade 55 is disposed in the non-shading position. This reduces the shade area SA formed ahead of the vehicle 10, and an additional light distribution pattern PA is formed by light shone from the second lamp unit 38.

When a signal is transmitted thereto which signals a command to switch off the second lamp unit 38, the headlamp control unit 20 first controls the moving mechanism so as to move the movable shade 55 towards its shading position, whereby the movable shade 55 is disposed in the shading position. Then, since the movable shade 55 is disposed in the shading position, light shone from the second lamp unit 38 is cut off by the movable shade 55, whereby the additional light distribution pattern PA is turned off.

In this state, the headlamp control unit 20 stops feeding the semiconductor light emitting elements 52-1 to 52-13 of the light emitting element array 52, whereby the semiconductor light emitting elements 52-1 to 52-13 are switched off.

In the vehicle lamp control system 11, when determining from signals from the wheel speed sensors 16 that the traveling speed of the vehicle 10 exceeds a predetermined value, the headlamp control unit 20 switches on the semiconductor light emitting elements 52-1 to 52-13 of the light emitting element array 52 of the second lamp unit 38. This forms the additional light distribution pattern PA together with a low beam light distribution pattern PL ahead of the vehicle 10, whereby the area ahead of the vehicle 10 is made more visible to the driver.

In this way, also when switching on the semiconductor light emitting elements 52-1 to 52-13 of the light emitting element array 52 of the second lamp unit 38 according to the traveling speed of the vehicle 10, the headlamp control unit 20 feeds the semiconductor light emitting elements 52-1 to 52-13 of the light emitting element array 52 to switch on the semiconductor light emitting elements 52-1 to 52-13 after the movable shade 55 is disposed in the shading position.

With the second lamp unit 38 left switched on, when determining based on information from the camera 18 that there exists a preceding vehicle C traveling ahead of the vehicle 10, the headlamp control unit 20 controls the moving mechanism so as to move the movable shade 55 to the shading position so as to restrict the second lamp unit 38 from shining light to the preceding vehicle C. This restricts the generation of glare to an occupant of the preceding vehicle C.

Incidentally, when the camera 18 captures light shone from the second lamp unit 38 and reflected by a roadside billboard or sign board such as a road sign, the sign board such as a road sign is erroneously recognized as a preceding vehicle based on the information from the camera 18, leading to fears that the movable shade 55 is moved.

Figure 26A:
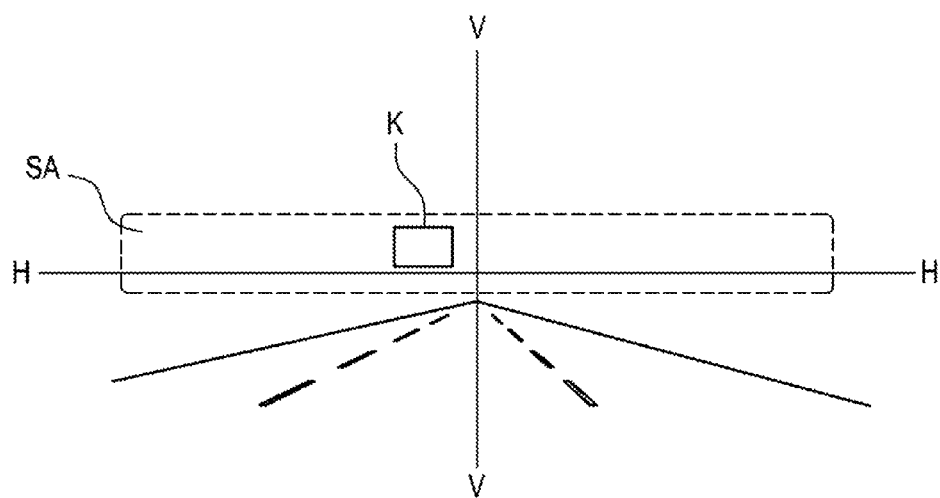
FIGS. 26A to 26C are diagrams explaining the control of a movable shade when a second lamp unit is lit in the vehicle lamp control system according to the fourth embodiment, and showing schematically light distribution patterns.
Figure 26B:
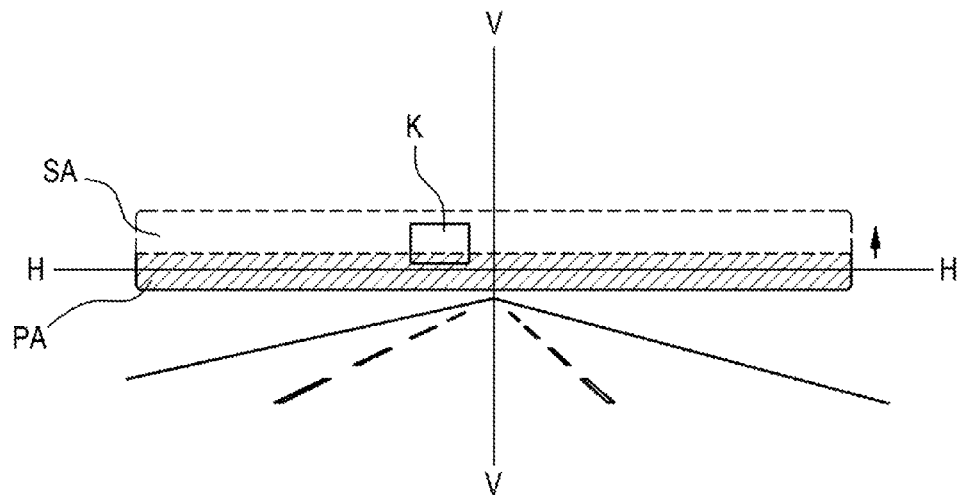
Figure 26C:
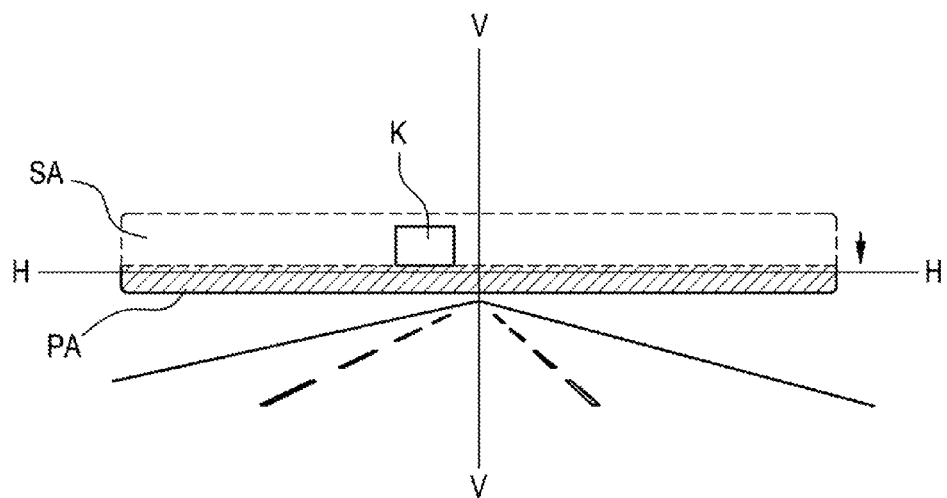

In these situations, in the vehicle lamp control system 11 according to this embodiment, when switching on the second lamp unit 38, firstly, the movable shade 55 which is in the non-shading position is moved to be disposed in the shading position, whereafter the semiconductor light emitting elements 52-1 to 52-13 of the light emitting element array 52 are switched on. Thereafter, as shown in FIG. 26A, the shade area SA is formed ahead of the vehicle 10 by the movable shade 55. Then, when the movable shade 55 is moved downwards to the non-shading position from this state, the shade area SA gets gradually smaller from a lower side thereof, whereas the additional light distribution pattern PA gets gradually greater. Then, as shown in FIG. 26B, when the additional light distribution pattern PA reaches a lower portion of a sign board K, light shone on to the sign board K is reflected, and the reflected light is captured by the camera 18, whereby the sign board K is erroneously recognized as a preceding vehicle C. This moves the movable shade 55 upwards to expand the range of the shade area SA downwards, whereby the sign board K overlaps the shade area SA, as shown in FIG. 26C.

Figure 27A:
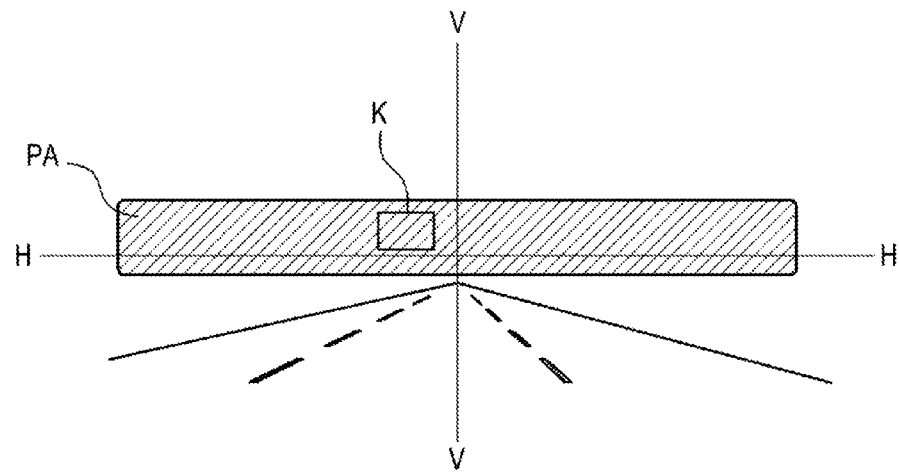
FIGS. 27A and 27B are diagrams explaining a general control of the movable shade when the second lamp unit is lit, and showing schematically light distribution patterns.
Figure 27B:
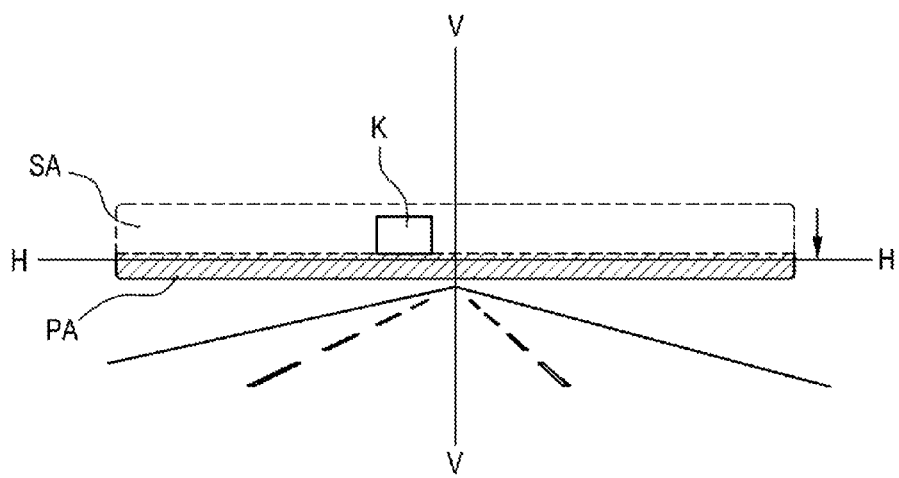

On the other hand, in a general control to switch on the semiconductor light emitting elements 52-1 to 52-13 of the light emitting element array 52 with the movable shade 55 disposed in the non-shading position when switching on the second lamp unit 38, firstly, as shown in FIG. 27A, an additional light distribution pattern PA is formed ahead of the vehicle 10 by light shone from the second lamp unit 38, and the light so shone strikes the whole of the sign board K. Then, the light shone on to the sign board K is reflected, and the reflected light is captured by the camera 18, whereby the sign board K is erroneously recognized as a preceding vehicle C. This moves the movable shade 55 greatly upwards to thereby form a shade area SA which covers the sign board K as shown in FIG. 27B. In this way, according to the control in which the additional light distribution pattern PA is once formed, whereafter the movable shade 55 is moved to form the shade area SA which covers the sign board K, the light shining or illumination area changes greatly ahead of the vehicle 10, leading to fears that the driver feels troublesomeness.

Thus, as has been described heretofore, according to the vehicle lamp control system of this embodiment, when switching the semiconductor light emitting elements 52-1 to 52-13 from the switched off state to the switched on state, the movable shade 55 is disposed in the shading position where the movable shade 55 can cut off light from the semiconductor light emitting elements 52-1 to 52-13. Thereafter, the semiconductor light emitting elements 52-1 to 52-13 are illuminated, and the movable shade 55 is moved to reduce the shielding range after the semiconductor light emitting elements 52-1 to 52-13 are illuminated. Consequently, compared with the case where the wide area lying ahead of the vehicle 10 is illuminated suddenly by the second lamp unit 38 to form the additional light distribution pattern PA, since the light shining or illumination range changes continuously so as to expand from a narrow state, the forward vision of the driver ahead of the vehicle 10 can be enhanced while restricting the driver from having to feel a sensation of physical disorder. In addition, the light distribution pattern can be made to change visually smartly. Since the area on to which the light from the second lamp unit 38 is shone is expanded gradually by moving the movable shade 55 from the shading position, compared with the case where the second lamp unit 38 is switched on to be illuminated suddenly, the driver is allowed to get used to the flow of the light distribution pattern when the second lamp unit 38 is switched on, whereby the load of the driver in relation to watching the change in light distribution pattern can be mitigated.

In particular, in the case of the traveling speed of the vehicle 10 exceeding the predetermined value, the semiconductor light emitting elements 52-1 to 52-13 are illuminated after the movable shade 55 has been disposed in the shading position, and the movable shade 55 is moved to reduce the shielding range after the semiconductor light emitting elements 52-1 to 52-13 have been illuminated. Thus, even in the event that the sign board K or the traffic signal S is erroneously recognized as the preceding vehicle C, the drawback can be restricted in which the light shining or illumination area of the light shone from the second lamp unit 38 changes greatly to cause the driver to feel troublesomeness.

In addition, in forming the additional light distribution pattern PA which is a high beam light distribution pattern for illuminating a far area ahead of the vehicle 10, the semiconductor light emitting elements 52-1 to 52-13 are illuminated after the movable shade 55 has been disposed in the shading position, and the movable shade 55 is moved to reduce the shielding range after the semiconductor light emitting elements 52-1 to 52-13 have been illuminated. Thus, the visibility of the driver ahead of the vehicle 10 can be enhanced while restricting the driver from having to feel a sensation of physical disorder when the high beam is started to be shone.

In this embodiment, in switching the semiconductor light emitting elements 52-1 to 52-13 from the switched on state to the switched off state, the semiconductor light emitting elements 52-1 to 52-13 are switched off after the movable shade 55 has been moved to the shading position, whereby compared with the case where the second lamp unit 38 is switched off in such a way that the wide illumination range suddenly disappears ahead of the vehicle 10, since the illumination range changes continuously so as to get smaller gradually, the driver can be restricted from having to feel a sensation of physical disorder when the second lamp unit 38 is switched off. In addition, the light distribution pattern can be made to change visually smartly. In particular, in the control in which the second lamp unit 38 is switched off according to the vehicle speed, when the second lamp unit 38 is switched off suddenly, there may be such a situation that the driver feels a sensation of physical disorder to recognize that the second lamp unit 38 fails. In contrast with this, according to this embodiment, since the illumination range of the light shone from the second lamp unit 38 is reduced gradually by moving the movable shade 55 to the shading position, also in the control in which the second lamp unit 38 is switched off according to the vehicle speed, the second lamp unit 38 can be switched off without causing the driver to feel a sensation of physical disorder.

When a first lamp unit 36 is switched on or off with the second lamp unit 38 left switched off, the movable shade 55 may be disposed in either the non-shading portion or the shading position.

In addition, the feeding of the semiconductor light emitting elements 52-1 to 52-13 may be controlled so that the light emitting element array 52 of the second lamp unit 38 is switched on and off moderately. As this occurs, when the second lamp unit 38 is switched on, the movable shade 55 which is being disposed in the shading position may be started to move before the luminous intensity of the light emitting element array 52 reaches a target luminous intensity.

In the vehicle lamp control system 11 according to this embodiment, an electronic swivel control is carried out in which a current value at which the semiconductor light emitting elements 52-1 to 52-13 of the light emitting element array 52 are fed is controlled according to the traveling direction of the vehicle 10, whereby the luminous intensity of light shone from the second lamp unit 38 is changed according to the traveling direction of the vehicle 10.

Figure 28A:
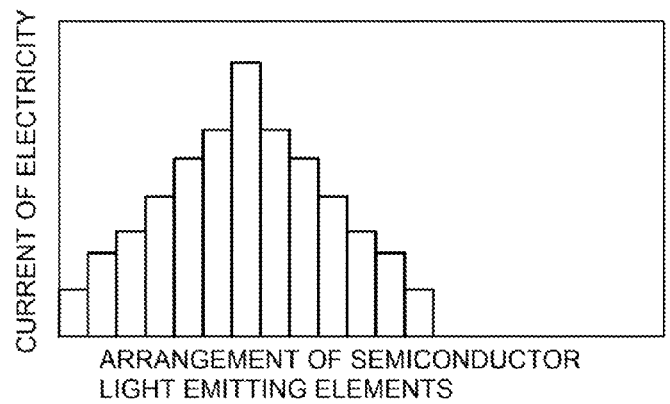
FIGS. 28A to 28C are diagrams explaining an electronic swivel control in the vehicle lamp control system according to the fourth embodiment, and showing current distributions according to arrangements of semiconductor light emitting elements.
Figure 28B:
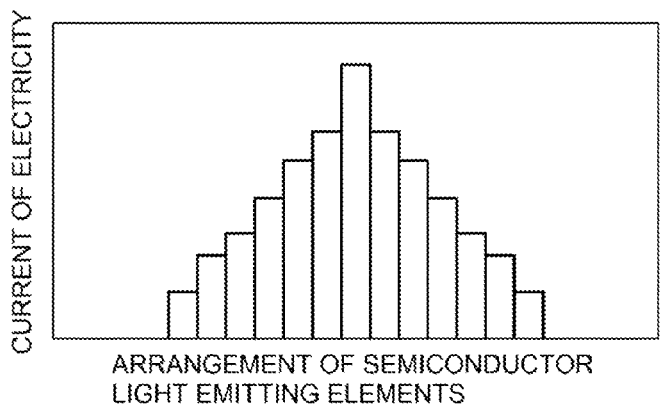
Figure 28C:
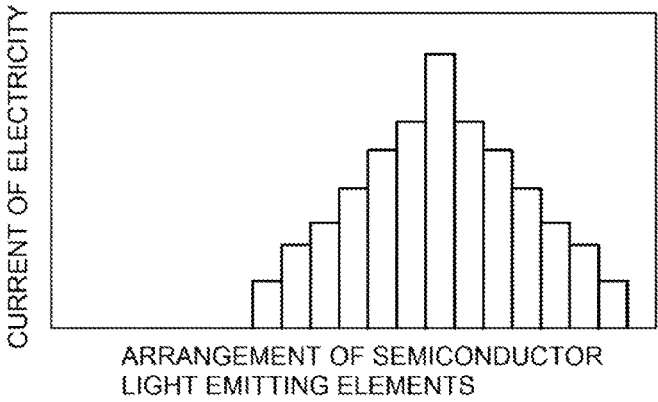

For example, when the vehicle 10 rounds a path which curves to the right from a state in which the semiconductor light emitting elements 52-1 to 52-13 of the light emitting element array 52 are illuminated with a current distribution of current values at which the semiconductor light emitting elements 52-1 to 52-13 are fed which deviates to the left as shown in FIG. 28A, the headlamp control unit 20 starts shifting the current distribution of electric values towards the right as shown in FIG. 28B based on information from the wheel speed sensors 16 or the steering angle sensor 17, resulting in a current distribution of electric values which deviates to the right where the vehicle 10 is traveling. This enhances the luminous intensity of light which illuminates a forward area ahead of the vehicle 10 in the traveling direction, thereby making it possible to enhance the forward vision of the driver in the traveling direction along the curved path.

Figure 29:
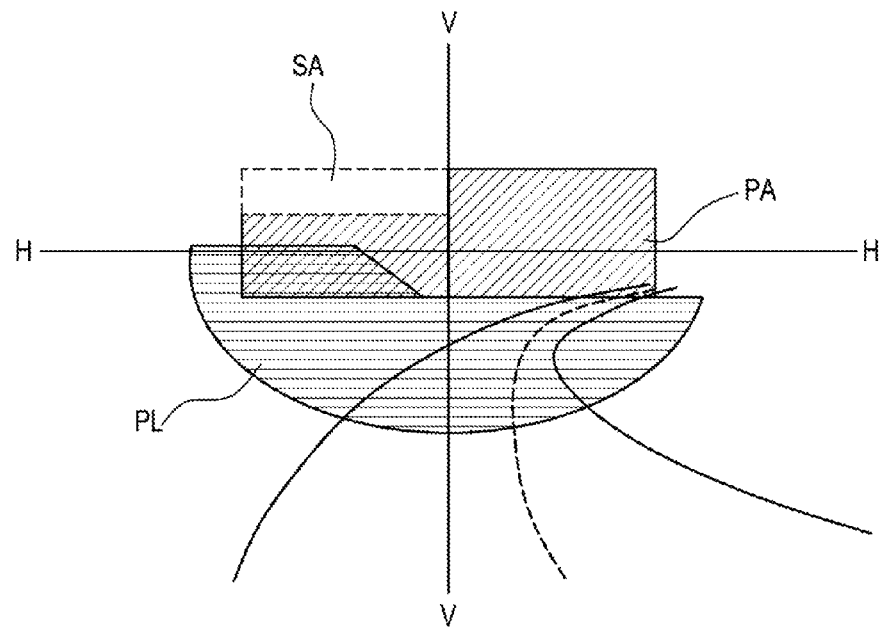
FIG. 29 is a schematic diagram showing a control to be executed on a curved path in the vehicle lamp control system according to the fourth embodiment.

As this occurs, in the vehicle lamp control system 11, the headlamp control unit 20 controls independently the movable shade 55 of a right headlamp unit 22R and the movable shade 55 of a left headlamp unit 22L, whereby the movable shade 55 of the left headlamp unit 22L which cuts off light illuminating a leftward area which lies opposite to the rightward area where the vehicle 10 is traveling is moved to its shading position. Then, as shown in FIG. 29, a shade area SA is formed partially at a left upper portion of an additional light distribution pattern PA in the leftward area which lies opposite to the rightward area where the vehicle 10 is traveling to thereby narrow the additional light distribution pattern PA. Consequently, the load of the driver in watching the area residing outside the traveling direction is reduced, allowing the driver to pay more attention in watching the rightward area where the vehicle 10 is traveling.

Figure 30:
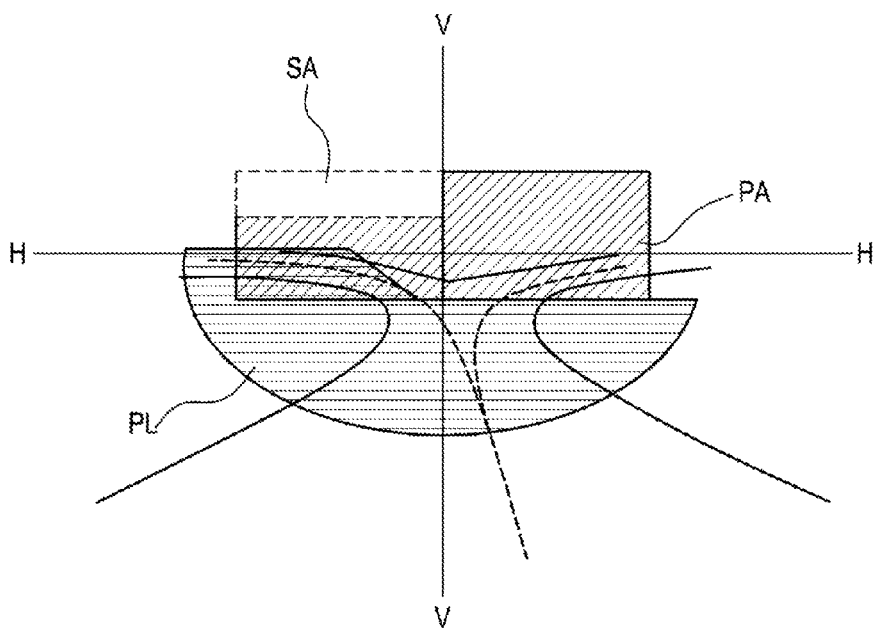
FIG. 30 is a schematic diagram showing a control to be executed on a branch path in the vehicle lamp control system according to the fourth embodiment.

In addition, in the vehicle lamp control system 11 according to this embodiment, for example, at a branch path where a road branches into two, the headlamp control unit 20 calculates a traveling direction based on information from the navigation system 19 and executes the electronic swivel control described above to thereby shine light from the second lamp unit 38 towards the rightward area where the vehicle 10 is traveling. Further, the headlamp control unit 20 moves the movable shade 55 of the left headlamp unit 22L which cuts off the light illuminating the leftward area which lies opposite to the rightward area where the vehicle 10 is traveling to its shading position, whereby as shown in FIG. 30, the shade area SA is formed partially at the left upper portion of the additional light distribution pattern PA in the leftward area which lies opposite to the rightward area where the vehicle 10 is traveling to thereby narrow the additional light distribution pattern PA. This reduces the load of the driver in watching the area residing outside the traveling direction, allowing the driver to pay more attention in watching the rightward area where the vehicle 10 is traveling.

The invention is not limited to the embodiments and the modified examples, and hence, they can be modified, improved and/or combined as required without departing from the spirit and scope of the invention. In addition, the materials, shapes, dimensions, numeric values, forms, numbers, locations and the like described in relation to the constituent elements in the embodiments are arbitrary and hence, the invention is not limited thereto, as long as the invention can be achieved.

While the invention has been described in detail and by reference to the specific embodiments, it is obvious to those skilled in the art to which the invention pertains that various alterations and modifications can be made thereto without departing from the spirit and scope of the invention.

This patent application is based on Japanese Patent Application No. 2013-199407 filed on Sep. 26, 2013 and Japanese Patent Application No. 2013-199409 filed on Sep. 26, 2013, the contents of which are incorporated herein by reference.

DESCRIPTION OF REFERENCE NUMERALS AND CHARACTERS

11: vehicle lamp control system; 16: wheel speed sensor (vehicle speed sensor); 18: camera (preceding vehicle detection sensor); 20: headlamp control unit (control unit); 36: first lamp unit (first lamp unit); 38: second lamp unit (second lamp unit); 48: projection lens; 52-1 to 52-13: semiconductor light emitting element; 55: movable shade; 56: reflecting portion; 57: optical member; 58: solar battery module; PA: additional light distribution pattern (second light distribution pattern); PL: low beam light distribution pattern (first light distribution pattern).

The invention claimed is:

1. A vehicle lamp control system comprising:
a projection lens;
a semiconductor light emitting element which is disposed near a rear focal point of the projection lens and which emits light towards the projection lens;
a pair of reflecting portions arranged about the semiconductor light emitting element, wherein the pair of reflecting portions cause the light emitted by the semiconductor light emitting element to travel through the projection lens;
a movable shade which can move between a shading position where the movable shade can cut off light which is emitted from the semiconductor light emitting element to be incident on the projection lens, and a non-shading position where the movable shade does not cut off light which is emitted from the semiconductor light emitting element to be incident on the projection lens; and
a control unit configured to execute a control to move the movable shade to the shading position when the semiconductor light emitting element is switched off.

2. The vehicle lamp control system according to claim 1, comprising:
an optical member configured to transmit or reflect at least part of light incident thereon, wherein
the movable shade has a reflecting portion at a portion which faces the projection lens, and wherein
the optical member is disposed in a position where light which passes through the projection lens to be reflected by the reflecting portion can be incident on the optical member, when the control unit causes the movable shade to be located at the shading position.

3. The vehicle lamp control system according to claim 1, comprising:
a solar module having a generating device, wherein
the movable shade has a reflecting portion at a portion which faces the projection lens, and wherein
the generating device is disposed in a position where light which passes through the projection lens to be reflected by the reflecting portion can be incident on the generating device, when the control unit causes the movable shade to be located at the shading position.

4. A vehicle lamp control system comprising:
a first lamp unit configured to shine light for forming a first light distribution pattern head of a lamp;
a second lamp unit having a semiconductor light emitting element, and a movable shade which is configured to move in a predetermined direction, and which can change a shading range where light emitted from the semiconductor light emitting element is cut off according to a position to which the movable shade is moved,
wherein the second lamp unit is configured to shine the light of the semiconductor light emitting element to form a second light distribution pattern in a position lying further upwards, with respect to a ground surface, than the first light distribution pattern; and
a control unit configured to execute a control in which the semiconductor light emitting element is illuminated after the movable shade is disposed in a shading position where the movable shade can cut off the light from the semiconductor light emitting element and thereafter, the movable shade is moved so as to reduce the shading range after the semiconductor light emitting element is illuminated, when switching the semiconductor light emitting element from the switched off state to the switched on state.

5. The vehicle lamp control system according to claim 4, wherein
in the second lamp unit, a plurality of semiconductor light emitting elements including the semiconductor light emitting element are arranged so as to be aligned in a predetermined direction, and the second light distribution pattern is formed by light from the plurality of semiconductor light emitting elements.

6. The vehicle lamp control system according to claim 5, comprising:
a vehicle speed sensor for measuring a traveling speed of a vehicle; and
a preceding vehicle detection sensor for detecting a preceding vehicle, wherein
when the traveling speed exceeds a predetermined value, the control unit executes a control in which the semiconductor light emitting element is illuminated after the movable shade is disposed in the shading position, and the movable shade is moved to reduce the shading range after the semiconductor light emitting element is illuminated.

7. The vehicle lamp control system according to claim 6, wherein
the first light distribution pattern is a low beam light distribution pattern, and wherein
the second light distribution pattern is a high beam light distribution pattern.

8. The vehicle lamp control system according to claim 7, wherein
when switching the semiconductor light emitting element from a switched on state to a switched off state, the control unit executes a control in which the semiconductor light emitting element is switched off after the movable shade is moved to the shading position.

9. The vehicle lamp control system according to claim 6, wherein
when switching the semiconductor light emitting element from a switched on state to a switched off state, the control unit executes a control in which the semiconductor light emitting element is switched off after the movable shade is moved to the shading position.

10. The vehicle lamp control system according to claim 5, wherein
the first light distribution pattern is a low beam light distribution pattern, and wherein
the second light distribution pattern is a high beam light distribution pattern.

11. The vehicle lamp control system according to claim 10, wherein
when switching the semiconductor light emitting element from a switched on state to a switched off state, the control unit executes a control in which the semiconductor light emitting element is switched off after the movable shade is moved to the shading position.

12. The vehicle lamp control system according to claim 5, wherein
when switching the semiconductor light emitting element from a switched on state to a switched off state, the control unit executes a control in which the semiconductor light emitting element is switched off after the movable shade is moved to the shading position.

13. The vehicle lamp control system according to claim 4, comprising:
a vehicle speed sensor for measuring a traveling speed of a vehicle; and
a preceding vehicle detection sensor for detecting a preceding vehicle, wherein
when the traveling speed exceeds a predetermined value, the control unit executes a control in which the semiconductor light emitting element is illuminated after the movable shade is disposed in the shading position, and the movable shade is moved to reduce the shading range after the semiconductor light emitting element is illuminated.

14. The vehicle lamp control system according to claim 13, wherein
the first light distribution pattern is a low beam light distribution pattern, and wherein
the second light distribution pattern is a high beam light distribution pattern.

15. The vehicle lamp control system according to claim 14, wherein
when switching the semiconductor light emitting element from a switched on state to a switched off state, the control unit executes a control in which the semiconductor light emitting element is switched off after the movable shade is moved to the shading position.

16. The vehicle lamp control system according to claim 13, wherein
when switching the semiconductor light emitting element from a switched on state to a switched off state, the control unit executes a control in which the semiconductor light emitting element is switched off after the movable shade is moved to the shading position.

17. The vehicle lamp control system according to claim 4, wherein
the first light distribution pattern is a low beam light distribution pattern, and wherein
the second light distribution pattern is a high beam light distribution pattern.

18. The vehicle lamp control system according to claim 17, wherein
when switching the semiconductor light emitting element from a switched on state to a switched off state, the control unit executes a control in which the semiconductor light emitting element is switched off after the movable shade is moved to the shading position.

19. The vehicle lamp control system according to claim 4, wherein
when switching the semiconductor light emitting element from a switched on state to a switched off state, the control unit executes a control in which the semiconductor light emitting element is switched off after the movable shade is moved to the shading position.

* * * * *